(12) United States Patent
Cabrera-Llanos et al.

(10) Patent No.: US 7,143,610 B2
(45) Date of Patent: Dec. 5, 2006

(54) METHOD AND SYSTEM FOR FEEDING AND BURNING A PULVERIZED FUEL IN A GLASS MELTING FURNACE, AND BURNER FOR USE IN THE SAME

(75) Inventors: Roberto Marcos Cabrera-Llanos, Nuevo León (MX); Rafael Valadez-Castillo, Nuevo León (MX); Arturo Keer-Rendon, Chihuahua (MX)

(73) Assignee: Vitro Global, S.A., Givisiez (CH)

( * ) Notice: Subject to any disclaimer, the term of this patent is extended or adjusted under 35 U.S.C. 154(b) by 111 days.

(21) Appl. No.: 10/716,891

(22) Filed: Nov. 18, 2003

(65) Prior Publication Data

US 2004/0107883 A1    Jun. 10, 2004

Related U.S. Application Data

(63) Continuation-in-part of application No. 10/601,167, filed on Jun. 20, 2003, now Pat. No. 6,789,396, which is a continuation-in-part of application No. 09/816,254, filed on Mar. 23, 2001, now abandoned.

(51) Int. Cl.
*C03B 5/235* (2006.01)
*F23D 1/00* (2006.01)
*C03B 5/237* (2006.01)
*C03B 5/435* (2006.01)

(52) U.S. Cl. .......................... 65/356; 65/346; 65/347; 110/261; 110/265; 431/158; 431/160; 431/177

(58) Field of Classification Search ............... 65/134.1, 65/134.2, 134.8, 19, 27, 335–337, 347, 355, 65/374.13, 375, 346, 356; 110/101 R, 106, 110/186, 261–267, 347, 293; 431/2, 11, 431/157, 158, 174–180, 160; 432/13, 14, 432/180–182
See application file for complete search history.

(56) References Cited

U.S. PATENT DOCUMENTS

| | | | | |
|---|---|---|---|---|
| 3,397,256 A | * | 8/1968 | Paul et al. | 432/14 |
| 3,515,529 A | * | 6/1970 | Love et al. | 65/27 |
| 3,969,068 A | * | 7/1976 | Miller et al. | 432/13 |
| 4,391,581 A | * | 7/1983 | Daman et al. | 431/160 |
| 4,671,765 A | * | 6/1987 | Tsai | 432/13 |
| 5,032,163 A | * | 7/1991 | Balestra | 65/349 |
| 5,147,438 A | * | 9/1992 | Castelain et al. | 65/134.4 |

* cited by examiner

*Primary Examiner*—Eric Hug
(74) *Attorney, Agent, or Firm*—Abelman, Frayne & Schwab

(57) ABSTRACT

A method and system feed and burn pulverized fuel, such as petroleum coke, in a glass melting furnace having burners associated with sealed regenerative chambers which act as heat exchangers. The system supplies the pulverized fuel for melting glass raw materials. The emissions of flue gases produced by the combustion process of the fuel in the furnace are controlled in order to maintain clean the flue gases and for reducing the emission of impurities from the fuel such as SOx, NOx, and particulates. The regenerative chambers are manufactured with selected refractories such as magnesium, zircon-silica-alumina, or magnesia and zirconium-silicate, for counteracting the erosive and corrosive effects produced by the combustion process of the fuel in the glass melting chamber. A burner feeds the petroleum coke and simultaneously mixes a primary air and pulverized fuel-air mixture for the burning of the pulverized fuel.

14 Claims, 13 Drawing Sheets

SYSTEM FOR FEEDING AND BURNING PULVERIZED
PETROLEUM COKE IN AT LEAST A BURNER OF A
GLASS MELTING FURNACE (A)

- A SYSTEM FOR FEEDING AND HANDLING THE PULVERIZED PETROLEUM COKE
- A DOSING SYSTEM FOR DOSING THE PULVERIZED PETROLEUM COKE
- A COMBUSTION SYSTEM FOR BURNING THE PULVERIZED PETROLEUM COKE

FIGURE 2

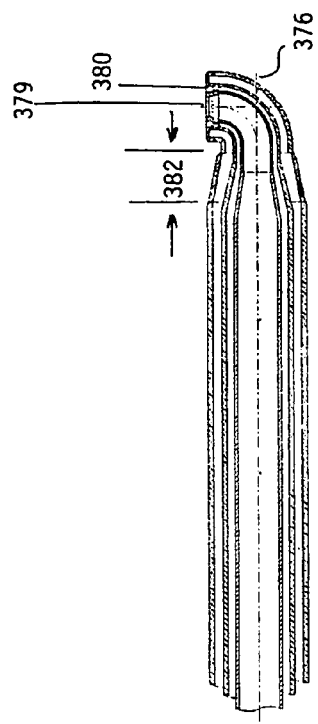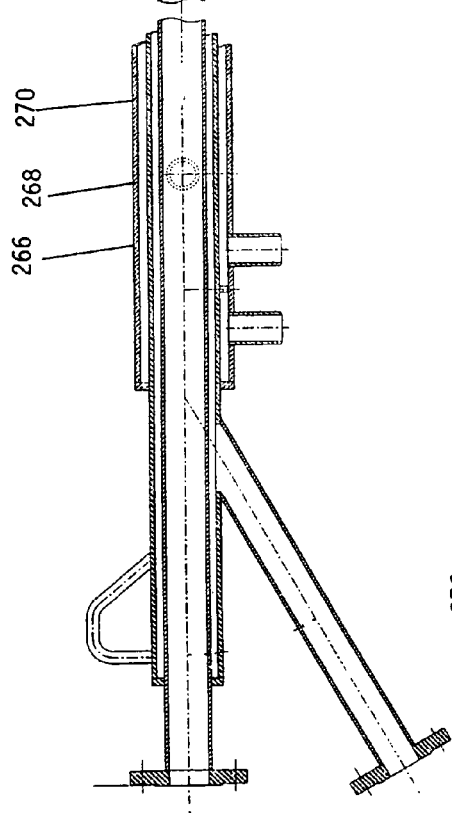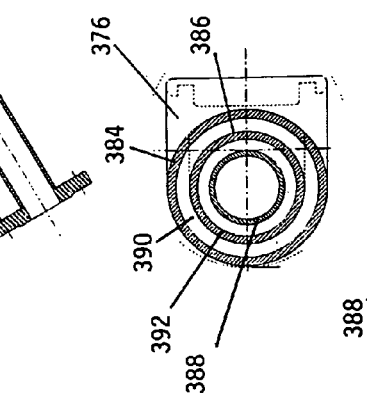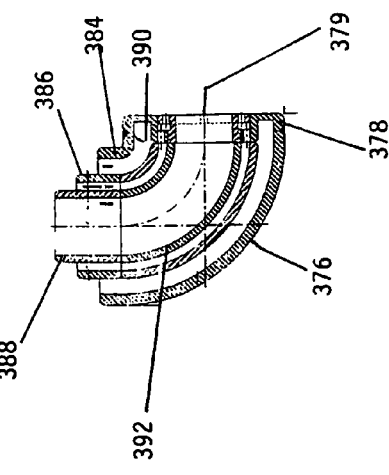
FIGURE 14
FIGURE 15
FIGURE 16

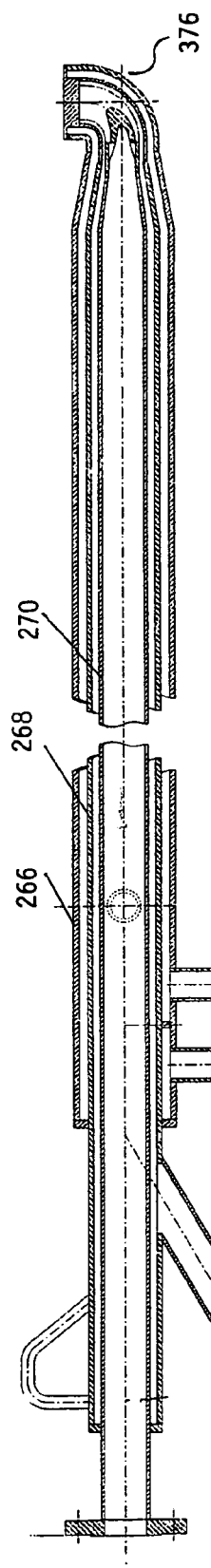
FIGURE 19
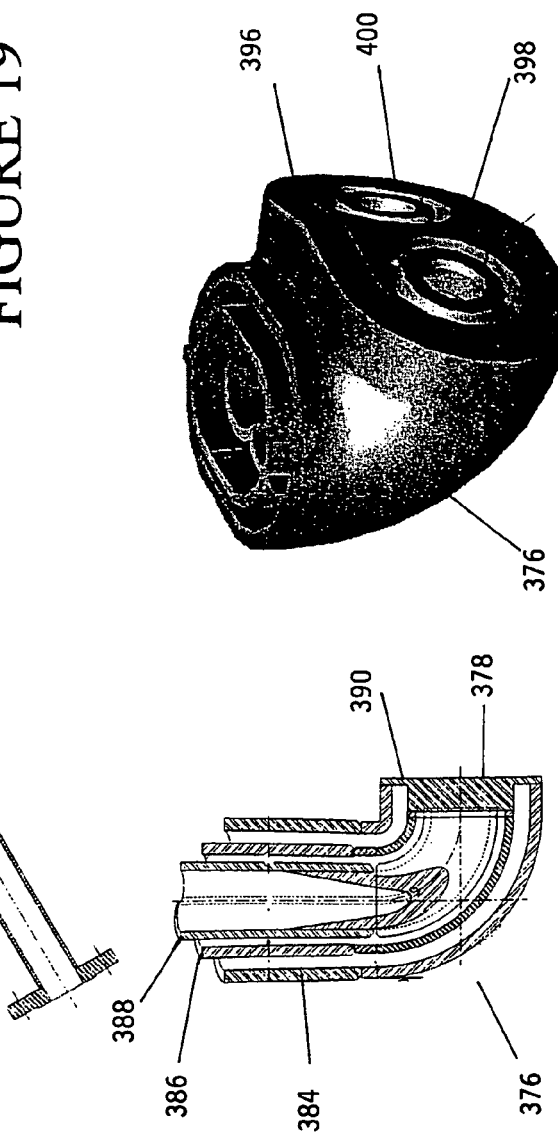
FIGURE 20
FIGURE 21

METHOD AND SYSTEM FOR FEEDING AND BURNING A PULVERIZED FUEL IN A GLASS MELTING FURNACE, AND BURNER FOR USE IN THE SAME

CROSS-REFERENCE TO RELATED APPLICATIONS

The present application is a continuation-in-part of U.S. application Ser. No. 10/601,167 filed Jun. 20, 2003, now U.S. Pat. No. 6,789,396 B2, issued Sep. 14. 2004, which is a Continuation-in-Part of U.S. application Ser. No. 09/816,254 filed Mar. 23, 2001, now abandoned, both of which are incorporated herein by reference.

BACKGROUND OF THE INVENTION

1. Field of the Invention

The present invention is related to a method and system for feeding and burning a pulverized fuel in a glass melting furnace and, more specifically to a method and system for feeding and burning pulverized petroleum coke in a glass meting furnace and a burner for use in the same.

2. Related Prior Art

Melting glass has been done in different kinds of furnaces and using diferent types of fuels, depending on the final characteristics of the product and also with regard to the thermal efficiency of the melting and refining processes. Unit melter furnaces have been used to melt glass (by means of gas fuel). These furnaces have several burners along the sides of the furnace, and the whole unit looks like a closed box where there is a chimney that can be placed either in the beginning of the feeder or at the very end of the furnace, in other words, going downstream. However there is an enormous heat loss in the glass leaving high-temperature operating furnaces. At 2500° F., for example, the heat in the flue gases is 62 percent of the heat input for a natural gas fired furnace.

In order to take advantage of the remaining heat of the flue gases, a more sophisticated and expensive design came into being, named as the regenerative furnace. It is well known that, to operate a regenerative glass melting furnace, a plurality of gas burners are associated with a pair of sealed regenerators disposed side-by-side. Each regenerator has a lower chamber, a refractory structure above the lower chamber and an upper chamber above the structure. Each regenerator has a respective port connecting the respective upper chamber with a melting and refining chamber of the furnace. The burners are arranged to burn fuel, such as natural gas, liquid petroleum, fuel oil or other gaseous or liquid fuels which are suitable for use in the glass melting furnace and thereby supply heat for melting and refining the glass making materials in the chamber. The melting and refining chamber is fed with glass making materials at one end thereof at which is located a doghouse and has a molten distribuitor disposed at the other end thereof, which comprises a series of ports through which molten glass may be removed from the melting and refining chamber.

The burners may be mounted in a number of possible configurations, for example a through-port configuration, a side-port configuration or an under-port configuration. Fuel, e.g. natural gas, is fed from the burner into the incoming stream of pre-heated air coming from each regenerator during the firing cycle, and the resultant flame and products of combustion produced in that flame extend across the surface of the melting glass, and transfer heat to that glass in the melting and refining chamber.

In operation, the regenerators are cycled alternately between combustion air and exhaust heat cycles. Every 20 minutes, or 30 minutes, depending on the specific furnaces, the path of the flame is reversed. The objective of each regenerator is to store the exhausted heat, which allows a greater efficiency and a higher flame temperature that could otherwise be the case with cold air.

For operating the glass melting furnace, the fuel fed to the burners and the combustion air supplied is controlled by measuring at the port mouth and the top of the structure, the quantity of oxygen and combustible material present so as to ensure that within the melting chamber or at points along the melting chamber, the combustion air fed is less than that required for complete combustion of the fuel being supplied.

In the past, the fuel used to melt glass was fuel oil, coming from distillation of petroleum. For many years this kind of fuel was used, but the tighten of environmental regulations have been pushing for reduction of fuel oil, since this kind of oil has impurities coming from the petroleum crude oil, such as, sulphur, vanadium, nickel, and some other heavy metals. This kind of fuel oil produce pollutants such as SOx, NOx and particulates. Recently the glass industry has been used natural gas as a cleaner fuel. All the heavy metals and sulphur coming in the liquid stream of petroleum residuals from distillation are not contained in natural gas. However, the high temperature produced in the flame of natural gas has been very effective for producing more NOx than other pollutants. In this sense, a lot of effort has been done in order to develop low NOx burners for firing natural gas. Additionally, different technologies have been developed to prevent the NOx formation. An example of this is the Oxy-fuel Technology, which utilizes oxygen instead of air for the combustion process. This technology has the inconvenient of require a unit melter furnace with a special preparation of the refractories since air infiltration need to be prevented. The use of oxygen also produced a higher temperature flame, but with the absence of nitrogen the NOx production is drastically reduced.

The other inconvenient of oxy-fuel process is the cost of the oxygen itself. In order to make it cheaper it needs to place an oxygen plant besides the furnace in order to feed the required oxygen by the melting process.

However, the continuing upward spiral of energy costs (primarily natural gas) have forced the major float glass manufacturers to add "surcharges" to truckloads of flat glass. Natural gas prices have increased over 120% this year (in Mexico only or elsewre), far above previous estimates.

The general consensus among glass industry insiders is that distributors will be forced to take a close look at these new 'surcharges', and most likely be forced to pass them along.

Taking into account the previous art, the present invention is related to the application of different technologies to reduce the melting cost, using a solid fuel coming from the petroleum residuals of distillation towers, such as petroleum coke, in order to be used for glass production in an environmentally clean way.

The main difference of this type of fuel regarding fuel oil and natural gas is the physical state of the matter, since fuel oil is a liquid phase, natural gas is a gas phase while petroleum coke for instance is a solid. Fuel oil and petroleum coke have the same kinds of impurities, since both of them are coming from residuals of distillation tower of crude oil. The significant difference is the amount of impurities contained in each of these. Petroleum coke is produced in three types of different processes called delayed, fluid and flexi. The residuals from the distillation process are placed in drums and then heated up to from 900° to 1000° Farenheit degrees for up to 36 hours in order to take out most of the remaining volatiles from the residuals. The volatiles are extracted from the top of the coking drums and the remaining material in the drums is a hard rock make of around 90 percent of carbon and the rest of all the impurities from the crude oil used. The rock is extracted from the drums using hydraulic drills and water pumps.

A typical composition of petroleum coke is given as follow: carbon about 90%; hidrogen about 3%; nitrogen from about 2% to 4%; oxigen about 2%; sulphur from about 0.05% to 6%; and others about 1%.

Use of Petroleum Coke

Petroleum solid fuels have already been used in cement and steam power generation industries. According to the Pace Consultants Inc. the use of petroleum coke in years 1999 for cement and power generation were between 40% and 14% respectively.

In both industries, the burning of petroleum coke is used as a direct fire system, in which the atmosphere produced by the combustion of the fuel is in direct contact with the product. In the case of cement production, a rotary kiln is needed in order to provide a thermal profiled require by the product. In this rotary kiln, a shell of molten cement is always formed avoiding the direct contact of the combustion gases and flames with the refractories of the kiln, avoiding attack thereof. In this case, the calcined product (cement) absorbs the combustion gases, avoiding the erosive and abrasive effects of vanadium, $SO_3$ and NOx in the rotary kiln.

However, due to the high sulfur content and the presence of vanadium, petroleum coke as fuel is not commonly used as a fuel in the glass industry, due to the negative effect negative on the structure of the refractories and to environmental problems.

Problems With the Refractories

The glass industry use several kinds of refractory materials, and most of them are used to accomplish different functions, not only the thermal conditions but also the chemical resistance and mechanical erosion due to the impurities contained by fossil fuels.

Using a fossil fuel as the main energy source represents an input to the furnace of different kinds of heavy metals contained in the fuel, such as: vanadium pentoxide, iron oxide, chromium oxide, cobalt, etc. In the process of combustion most of the heavy metals evaporate because of the low vapor pressure of the metal oxide and the high temperature of the melting furnace.

The chemical characteristic of the flue gases coming out of the furnace is mostly acid because of the high content of sulphur from the fossil fuel. Also the vanadium pentoxide presents an acid behavior such as the sulphur flue gases. Vanadium oxide is one of metals that represents a source of damage to basic refractories, because the acid behavior of this oxide in gaseous state. Is well known that the vanadium pentoxide reacts strongly with calcium oxide forming a dicalcium silicate at 1275 celsius degrees.

The dicalcium silicate continues the damage to form a phase of merwinite and the to monticelite and finally to forsterite, which reacting with vanadium pentoxide to form a low melting point of tricalcium vanadate.

The only way to reduce the damage caused to basic refractories is the reduction of the amount of calcium oxide in the main basic refractory in order to avoid the production of dicalcium silicate that continues reacting with vanadium pentoxide until the refractory may fail.

On the other hand, the main problem with the use of the petroleum coke is related with the high sulfur and vanadium content, which have a negative effect on the structure of the refractories in the furnaces. The foremost requirement characteristics of a refractory is to withstand exposure to elevated temperature for extended periods of time. In addition it must be able to withstand sudden changes in temperature, resist the erosive action of molten glass, the corrosive action of gases, and the abrasive forces of particles in the atmosphere.

The effect of the vanadium on the refractories has been studied in different the papers, i.e. Roy W. Brown and Karl H. Sandmeyer in the paper "Sodium Vanadate's effect on superstructure refractories", Part I and Part II, The Glass Industry Magazine, November and December 1978 issues. In this paper the investigators tested different cast refractories which were centered on overcoming the vanadium attack in the flowing cast compositions, such as alumina-zirconia-silica (AZS), alpha-beta alumina, alpha alumina and beta alumina, which are commonly used in glass tank superstructures.

J. R. Mclaren and H. M. Richardson in the paper "The action of Vanadium Pentoxide on Aluminum Silicate Refractories" describe a series of experiments in which cone deformation were carried out on sets of ground samples from bricks with alumina content of 73%, 42% and 9%, each sample containing admixtures of vanadium pentoxide, alone or in combination with sodium oxide or calcium oxide.

The discussion of the results were focused on the action of Vanadium Pentoxide, the action of Vanadium Pentoxide with Sodium Oxide and the Action of Vanadium Pentoxide with Calcium oxide. They concluded that:

1.—Mullite resisted the action of vanadium pentoxide at temperatures up to 1700° C.

2.—No evidence was found of the formation of crystalline compounds or solid solutions of vanadium pentoxide and alumina or of vanadium pentoxide and silica.

3.—Vanadium pentoxide may act as a mineralizer during the slagging of alumino-silicate refractories by oil ash, but it is not a major salgging agent.

4.—Low-melting compounds are formed between vanadium pentoxide and sodium or calcium oxides, specially the former.

5.—In reactions between either sodium or calcium vanadates and alumino-silicates, lower-melting-point slags are formed with bricks high in silica than with bricks highs in alumina.

T. S. Busby and M. Carter in the paper "The effect of $SO_3$, $Na_2SO_4$ and $V_2O_5$ on the bonding minerals of basic refractories", Glass Technology Vol. 20, No. April, 1979, tested a number of spinels and silicates, the bond minerals of basic refractories, in a sulphurous atmosphere between 600 and 1400° C., both with and without additions of $Na_2SO_4$ and $V_2O_5$. It was found that some MgO or CaO in these minerals was converted to the sulphate. The reaction rate was increased by the presence of $Na_2SO_4$ or $V_2O_5$. Their results indicate that the CaO and MgO in basic refractories can be converted to the sulphate if they are used in a furnace where suphur is present in the waste gases. The formation of calcium sulphate ocuurs below 1400° C. and that of magnesium sulphate below about 1100° C.

However, as was described of the above, the effect of the vanadium on the refractories produce a great amount of problems in the glass furnaces, which has not solved in its totallity Petroleum Coke and the Environment Another problem of the use of the petroleum coke is related with the environment. The high content of sulphur and metals as nickel and vanadium produced by the combustion of the petroleum coke have provoked environmental problems. However, already exist developments for reduce or desulphurate the petroleum coke with a high content of sulphur (over 5% by weight). For example, the U.S. Pat. No. 4,389,388 issued to Charles P. Goforth on Jun. 21, 1983, concerns to the desulfurization of petroleum coke. Petroleum coke is processed to reduce the sulfur content. Ground coke is contacted with hot hydrogen, under pressurized conditions, for a residence time of about 2 to 60 seconds. The desulfurized coke is suitable for metallurgical or electrode uses.

U.S. Pat. No. 4,857,284 issued to Rolf Hauk on Aug. 15, 1989, is related to a process for removing sulphur from the waste gas of a reduction shaft furnace. In this patent, there is described a novel process for removing the sulphur contained in a gaseous compound by absorbtion from at least part of the waste gas of a reduction shaft furnace for iron ore. The waste gas is initially cleaned in a scrubber and cooled, followed by desulphurization, during which the sulphur-absorbing material is constituted by part of the sponge iron produced in the reduction shaft furnace. Desulphurization advantageously takes place at a temperature in the range 30° C. to 60° C. It is preferably carried out on the $CO_2$ separated from the blast furnace gas and the blast furnace gas part used as export gas.

The U.S. Pat. No. 4,894,122 issued to Arturo Lazcano-Navarro, et al, on Jan. 16, 1990, is related to a process for the desulphurization of residuals of petroleum distillation in the form of coke particles having an initial sulphur content greater than about 5% by weight. Desulphurization is effected by means of a continuous electrothermal process based on a plurality of sequentially connected fluidized beds into which the coke particles are successively introduced. The necessary heat generation to desulphurize the coke particles is obtained by using the coke particles as an electrical resistance in each fluidized bed by providing a pair of electrodes that extend into the fluidized coke particles and passing an electrical current through the electrodes and through the fluidized coke particles. A last fluidized bed without electrodes is provided for cooling the desulphurized coke particles after the sulphur level has been reduced to less than about 1% by weight.

The U.S. Pat. No. 5,259,864 issued to Richard B. Greenwalt on Nov. 9, 1993, is related to a method for both disposing of an environmentally undesirable material comprising petroleum coke and the sulfur and heavy metals contained therein and of providing fuel for a process of making molten iron or steel preproducts and reduction gas in a melter gasifier having an upper fuel charging end, a reduction gas discharging end, a lower molten metal and slag collection end, and means providing an entry for charging ferrous material into the melter gasifier; introducing petroleum coke into the melter gasifier at the upper fuel charging end; blowing oxygen-containing gas into the petroleum coke to form at least a first fluidized bed of coke particles from the petroleum coke; introducing ferrous material into the melter gasifier through the entry means, reacting petroleum coke, oxygen and particulate ferrous material to combust the major portion of the petroleum coke to produce reduction gas and molten iron or steel preproducts containing heavy metals freed from combustion of the petroleum coke and a slag containing sulfur freed from combustion of the petroleum coke.

An additional factor to be considered in the glass industry is the control of the environment mainly the air pollution. The melting furnace contributes over 99% of both particulates and gaseous pollutants of the total emissions from a glass plant. The fuel waste gas from glass melting furnaces consists mainly of carbon dioxide, nitrogen, water vapour, sulphur oxides and nitrogen oxides. The waste gases released from melting furnaces consist mainly of combustion gases generated by fuels and of gases arising from the melting of the batch, which in turn depends on chemical reactions taking place within this time. The proportion of batch gases from exclusively flame-heated furnaces represents 3 to 5% of the total gas volume.

The proportion of the air-polluting components in the fuel waste gas depends on the type of the firing fuel, its heating value, the combustion air temperature, the burner design, the flame configuration, and the excess of air supply. The sulphur oxides in the waste gases of glass melting furnaces originated from the fuel used, as well as from the molten batches.

Various mechanisms have been proposed that include volatilization of these metal oxides and as hydroxides. Whatever the case, it is well known as the result of chemical analysis of the actual particulate matter, that more than 70% of the materials are sodium compounds, about 10% to 15% are calcium compounds, and the balance are mostly magnesium, iron, silica and alumina.

Another important consideration in the glass melting furnace is the emission of $SO_2$. The emission of $SO_2$ is a function of the sulfur introduced in the raw materials and fuel. During the time of furnace heating such as after a rise in production level, an abundance of $SO_2$ is given off. The emissions rate of $SO_2$ ranges from about 2.5 pounds per ton of glass melted to up to 5 pounds per ton. The concentration of $SO_2$ in the exhaust is generally in the 100 to 300 ppm range for melting with natural gas. While using high sulfur fuel, approximately 4 pounds of $SO_2$ per ton of glass for every 1% of sulfur in the fuel is added.

On the other hand, the formation of NOx as result of combustion processes has been studied and described by a number of authors (Zeldovich, J. The oxidation of Nitrogen in Combustion and explosions. Acta. Physiochem. 21 (4) 1946; Edwards, J. B. Combustion: The formation and emissions of trace species. Ann Arbor Science Publishers, 1974. p-39). These were recognized and by the Emissions Standards Division, Office of Air Quality Planning and Standards, USEPA, in their report on "NOx Emissions from glass manufacturing" include Zeldovich on homogeneous NOx formation and Edwards with his presentation of empirical ecuations. Zeldovich developed rate constants for the formation of NO and $NO_2$ as the result of high temperature combustion processes.

Finally under normal operating condition, where flames are adjusted properly and the furnace is not starved for combustible air, very little CO or other residuals from incomplete combustion of fossil fuel are found in the exhaust. The gas concentration of these species will be less than 100 ppm, probably lower than 50 ppm, with a production rate of less than 0.2%/ton. The control for these pollutants is simply a proper combustion set up.

Processing techniques for the reduction of gaseous emissions are essentially restricted to the proper selection of firing fuels and raw materials, as well as to furnace design and operation. The U.S. Pat. No. 5,053,210 issued to Michael Buxel et al, on Oct. 1, 1991, describes a method and apparatus for the purification of flue gases, particularly for the desulphurization of and $NO_x$-elimination from flue gas by multistage adsorption and catalytic reaction in gravity-flow moving beds of granular, carbon-bearing materials contacted by a transverse steam of the gas, in which a minimum of two moving beds are arranged in series with reference to the gas route so that $NO_x$-elimination takes place in the second or any downstream moving bed. Where large volumes of flue gas from industrial furnaces must be purified, purification is adversely affected by the formation of gas streaks with widely varying sulphur dioxide concentrations. This disadvantage is eliminated in that the prepurified flue gas leaving the first moving bed and having a locally variable sulphur dioxide concentration gradient is subjected to repeated mixing before ammonia is added as reactant for $NO_x$-elimination.

The U.S. Pat. No. 5,636,240 issued to Jeng-Syan et al, on Jun. 3, 1997, is related to an air pollution control process and apparatus for glass furnaces for use in the furnace's waste gas outlet including passing the waste gases through a spray type neutralization tower to remove sulphates in the waste gases by spraying an absorbent (NaOH) to reduce the opacity of exhaust gas, and employing a pneumatic powder feeding device to feed flyash or calcium hydroxide periodically in a path between the spray type neutralization tower and a bag house to maintain normal functioning of the filter bag in the bag house.

Burners for Pulverized Fuel

Finally, for the burning of pulverized or dust petroleum coke is necessary to consider a special type of burner design. Generally, ignition energy is supplied to a combustible fuel-air mixture for igniting the burner flame. Some burner systems have been developed to burn pulverized fuel as coal o petroleum coke. PCT application PCT/EP83/00036 of Uwe Wiedmann et al, published on Sep. 1, 1983, describes a burner for pulvurulent, gaseous and/or liquid fuels. This burner has an ignition chamber with a wall, which opens out and having the rotation symmetry, as well as an exhaust pipe connected thereto. At the center of the chamber wall, there is arranged the inlet of a pipe for the admission of a fuel jet as well as an air supply surrounding said inlet for the admission of a vortex of combustion air which produces, inside the ignition chamber, a hot recirculation stream mixing the fuel jet and heating the latter at the ignition temperature. The air quantity of the vortex supplied to the ignition chamber is only a portion of the total combustion air required. In the area between the chamber wall and the exhaust pipe there is provided a second air admission pipe through which another portion of the combustion air may be introduced in the ignition chamber, said portion being totally or partially mixed with the fuel jet. The sum of the combustion air portions participating within the ignition chamber to the mixture with the fuel jet (an hence to the ignition and initiation of the combustion) is adjusted so as not exceed 50% of the total combustion air required. By conjugating all those measures, there is provided a burner particularly appropriate for the production of heat for industrial process and further having at intermediary and variable power rates a stable ignition producing a flame with an elongate and thin form in the combustion chamber and thus with a low radial deflection of particles.

The U.S. Pat. No. 4,412,810 issued to Akira Izuha et al, on Nov. 1, 1983, is related to a pulverized coal burner capable of carrying out combustion in a stable state with a reduction in the amounts of NOx, Co, and unburned carbon produced as the result of the combustion.

The U.S. Pat. No. 4,531,461 issued to William H. Sayler on Jul. 30, 1985, is related to a system for pulverizing and burning solid fuel, such as coal or other fossil fuel, and for burning such pulverized fuels suspended in a stream of air, principally in connection with industrial furnaces such as those used to heat gypsum-processing kettles and metallurgical furnaces.

The U.S. Pat. No. 4,602,575 issued to Klaus Grethe on Jul. 29, 1986, is related a Method of burning petroleum coke dust in a burner flame having an intensive internal recirculation zone. The petroleum coke dust is supplied to that region of the intensive recirculation zone which provided the ignition energy for the petroleum coke dust which is to be burned. However, this patent describes that, depending upon the type of processing which the crude oil has undergone, the petroleum coke can contain harfuml materials such as, vanadium which not only lead to corrosive compounds during combustion in steam generators, but furthermore considerably pollute the environment when they leave the "steam generator" with the flue gas. Suggest that, when this burner is used, these negatives effects or harfuml occurrences can be extensively avoided by adding vanadium-binding additives to the combustion via the incremental of air.

Another development on coal burners is illustrated in the U.S. Pat. No. 4,924,784 issued to Dennis R. Lennon et al, on May 15, 1990, which is related to the Firing of pulverized solvent refined coal in a burner for a "boiler or the like". Finally, the U.S. Pat. No. 5,829,367 issued to Hideaki Ohta et al, on Nov. 3, 1998, is related a burner for combustion of a pulverized coal mixture having two kinds of rich and lean concentration has a height of a burner panel of a burner panel reduced and the overall burner simplified. The burners applied for a boiler furnace or a chemical industrial furnace.

As has been described above, the developments have been focused to control the pollution of the petroleum coke, however, these have been focused on the desulphurization or decontamination of the petroleum coke.

On the other hand, notwithstanding that the petroleum coke has already been used in other industries, in some cases the same product absorbs the pollution gases, as well, the erosive and abrasive effects of vanadium on the furnaces (see cement industry).

In each case, the pollution problems and their solution depend on each industry. Each industry and furnaces have different thermal properties and problems with contaminants, with the type of refractories—which also influence energy consumption and product quality—, and over the furnace structure and over the product resultant.

Proposed Solution

Notwithstanding the foregoing, the glass industry has to date not considered the burning of petroleum coke for the melting of glass raw materials due to the consideration of all the factors above described, such as pollution and the high sulfur and vanadium contents, which have a negative effect on the structure of the refractories in the furnaces and also serious problems with the environment.

Considering all the processes described above, the present invention is related with the use of a low cost solid fuel, from petroleum distillation residual (petroleum coke) in order to produce commercial glass in an environmentally clean way, reducing the risk of damage in the refractories of the glass furnace and reducing the emissions of contaminant in the atmosphere. This solid fuel, as was described in the related art, has not previously been considered for use in the melting of glass materials because of the problems previously described.

In order to utilize of this invention effectively, combustion equipment for feeding and burning petroleum coke was developed in order to perform an efficient combustion. The invention also contemplates an emissions control system, which was located following the furnace in order to clean the flue gases to avoid the emission of impurities from the fuel, such as SOx, NOx and particulates. By the integration of developed equipment, selecting the right configuration of equipment and systems, it is possible to use a low cost fuel, produce commercial glass and generate flue gases within environmental regulations.

From the above, the present invention lies in the design of several systems placed in a single process in order to produce commercial glass in a side-port type glass furnace. So, in a glass melting furnace of side-port type, pulverized fuel of type composed of carbon, sulfur, nitrogen, vanadium, iron and nickel is burned for melting glass raw materials for the manufacture of glass sheets or containers. Means for supplying the pulverized fuel are fed in at least a burner that is arranged by each one of a plurality of first and second side ports of a glass melting region of said glass melting furnace, for burning the pulverized fuel during cycles of melting glass, said glass melting furnace including refractory means at regenerative chambers of a glass melting furnace for resisting the erosive action of the melting glass, the corrosive action of combustion gases and the abrasive forces of particles in the atmosphere provoked by the burning of said pulverized fuel in the furnace. Finally, means for controlling the air pollution in a waste gas outlet after that the combustion of the pulverized fuel in the glass melting furnace has been carried out, said means for controlling the air pollution reducing the emissions of sulfur, nitrogen vanadium, iron and nickel compounds at the atmosphere.

Furthermore, in order to reduce or avoid possible damage due to magnesium oxide, it is required to have at least a 98% of magnesium oxide where the purity of the raw materials forming the refractory reducing the amount of calcium oxide present in the material and retarding the formation of a molten phase. This refractory in order to have the impurities surrounded by magnesium oxide must be sintered at high temperature created a ceramic bond in the main material.

The basic refractory of 98% of magnesium oxide or greater is mostly used in the top rows of the regenerative chambers of the glass furnace. Another example of refractories that can be used in the regenerative chambers or top checkers where the Zircon-silica-alumina fused cast materials which also present an acid behavior as the vanadium pentoxide reducing the impact of damage to the refractories.

The right selection of refractory material within the glass furnace can reduce the impact of the impurities contained in the fossil fuel, based on the termodynamical analysis and the chemical composition of the impurities and the chemical compounds forming the refractories.

SUMMARY OF THE INVENTION

In accordance with the present invention a first objective of the present invention is to provide a method and system for feeding and burning a pulverized fuel in a glass melting furnace, for feeding and for burning pulverized petroleum coke and reducing the costs of melting glass.

An additional objective of the present invention is to provide a method and system for feeding and burning a pulverized fuel that contains carbon, sulfur, nitrogen, vanadium, iron and nickel in a glass melting furnace, which controls the emissions produced by the burning of the pulverized fuel, in order to clean the flue gases and reducing the emission of impurities from the pulverized fuel such as SOx, NOx and particulates, the reduction of emissions being controlled after the combustion of the pulverized fuel in the glass melting furnace has been carried out.

It is another objective of the present invention to provide a method and system for feeding and burning a pulverized fuel in a glass melting furnace, wherein a mix of pulverized fuel in combination with a primary air or gas is injected at high velocity in each one of the burners.

An additional object of the present invention is to provide a method and system for feeding and burning a pulverized fuel in a glass melting furnace, which uses special refractories for the construction of the chambers of the glass melting furnace with the object of diminish the erosive and abrasive effects produced by the burning of said pulverized fuel, specially by the effects produced by the $V_2O_5$.

An additional objective of the present invention to provide a method and system for feeding and burning a pulverized fuel in a glass melting furnace, wherein pulverized fuel is fed directly to the furnace in a relation fuel-air of about 16% of air in excess with respect to a stoichiometric air.

Another objective of the present invention is to provide a method and system for feeding and burning a pulverized fuel in a glass melting furnace, which also can be simultaneously melted with two or three types of fuel. Series of burners can be arranged in the melting chamber for burning independently petroleum coke, gas or fuel oil.

Other objective of the present invention is to provide a method and system for feeding and burning pulverized fuel in a glass melting furnace, wherein the pulverized fuel is fed by means of pneumatic means, with a elevated relation solid-air.

It is another objective of the present invention, to provide a burner for burning a pulverized fuel for use in a glass melting furnace, which includes an additional secondary air flow for the cooling of the burner, said secondary flow producing a swirl effect to regulate the flame of the burner by means of the introduction of additional air for improving the initial combustion of the solid fuel.

An additional objective of the present invention is to provide a burner for burning a pulverized fuel for use in a glass melting furnace, which is continuously cooled by water for supporting high operation temperatures i.e. of about 1500° C. Another objective of the present invention, is to provide a burner for burning a pulverized fuel for use in a glass melting furnace, which is capable of handling solid fuel in an operation range from 400 to 1300 kg/hr by means of pneumatic flow, with a pulverized fuel-air relation from 1 to 3.25 and with a transport air velocity of at least 18 m/seg.

An additional objective of the present invention is to provide a burner for burning a pulverized fuel for use in a glass melting furnace, which permits the possibility of use of another fuel, such as natural gas, in a secondary chamber, to increase the ignition process of the solid fuel.

Another objective of the present invention is to provide a burner for burning a pulverized fuel for use in a glass melting furnace, said burner generating a flame that is distributed uniformly through of its exit ends, in a regular form and with a length in function of the flow velocity of the air that is being used for carrying out the pneumatic transporting of the solid fuel.

An additional objective of the present invention is to provide a burner for burning a pulverized fuel for use in a glass melting furnace, which generates flames with a high radiant emissivity of 0.95, for carrying out an efficient process of the heat transference in the glass, for improving the performance with relation to others fuels such as, natural gas and fuel oil.

It is another objective of the present invention to provide a burner for burning a pulverized fuel for use in a glass melting furnace, which includes two exit ends (Y form), providing a proportional division to produce uniform and regular flows, to enlarge the flame and by consequence a better distribution of the heat transfer in the glass.

An additional objective of the present invention is to provide a burner for burning a pulverized fuel for use in a glass melting furnace, which uses a preheated air flow until 1200° C., improving the complete combustion of the solid fuel within the glass furnace.

It is another objective of the present invention to provide a burner for burning a pulverized fuel for use in a glass melting furnace which generates a low amount of NOx, due to that the adiabatic temperature of flame of the pulverized fuel is less that the adiabatic temperature of the gas in the same operation conditions.

Another objective of the present invention is to provide a burner for burning a pulverized fuel for use in a glass melting furnace, which generates a minor amount of water as an combustion product, reducing the generation of sodium hidroxidum within the glass furnace, as well as, reducing el attack to the refractories materials.

An additional objective of the present invention is to provide a burner for burning a pulverized fuel for use in a glass melting furnace, which is used to burn a solid fuel, which contains a low concentration of ashes and having a reduced granulometry (95% of the particles are minor of 74 micres), generating volant ashes that does not affect the glass quality.

These and other objectives and disadvantages of the present invention will be evident to the experts in the field from the following detailed description of the invention, which is illustrated in the attached drawings.

BRIEF DESCRIPTION OF THE DRAWINGS

FIG. 2 illustrates another block diagram of a first embodiment of the system for feeding and burning the petroleum coke in accordance with the present invention.

FIG. 14 is a side detailed view of a fourth embodiment of a burner with one exit nozzle;

FIG. 15 is a plant view showing the burner illustrated on FIG. 14;

FIG. 16 is a detailed view of a vertical section of the burner of FIG. 14;

FIG. 19 is a side detailed view of a fifth embodiment of a burner with two exit nozzles;

FIG. 20 is a detailed view of a vertical section of the burner of FIG. 19; and

FIG. 21 is a perspective view of a section of the burner illustrated in FIG. 20.

DETAILED DESCRIPTION OF THE INVENTION

Figure 1:
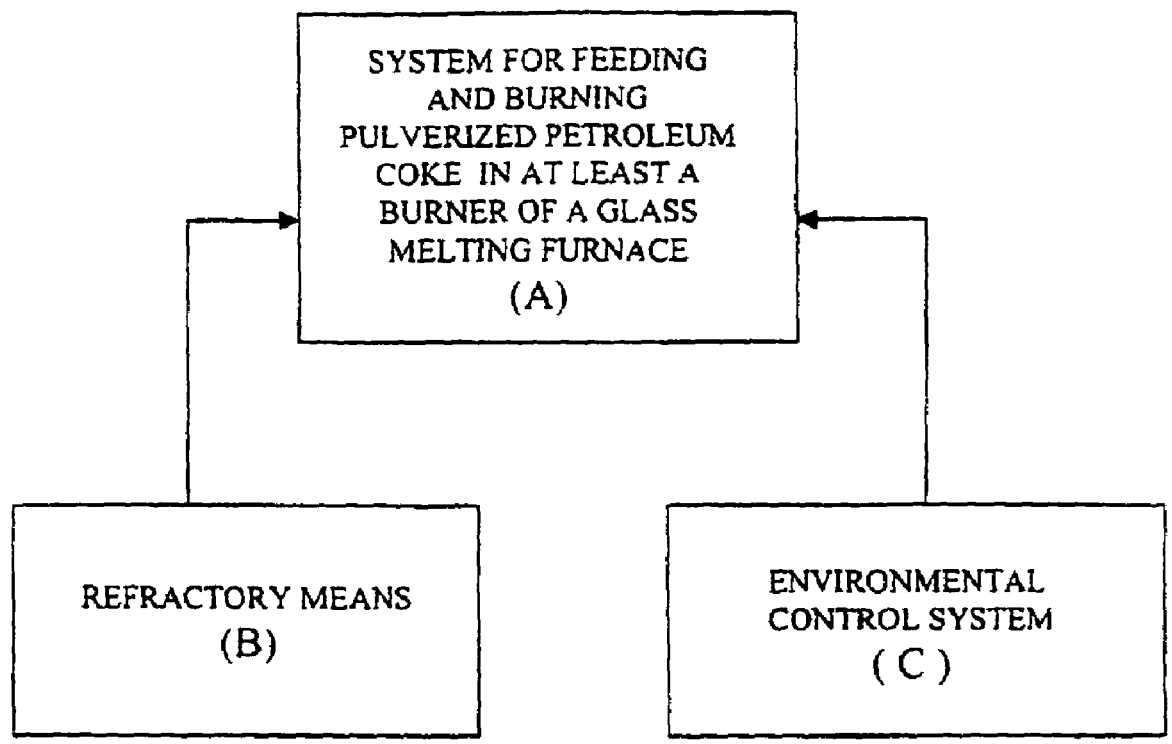
FIG. 1 is a block diagram of an embodiment of the present invention, comprising mainly: a system for feeding and burning a pulverized fuel in at least a burner of a glass melting furnace; refractory means in different shapes, forming the walls and floor of a glass melting furnace for resisting the erosive action of the melting glass, the corrosive action of combustion gases and the abrasive forces of particles in the atmosphere provoked by the burning of said pulverized fuel in the furnace; and a environmental control system for controlling the air pollution in a waste gas outlet after that the combustion of the pulverized fuel as been carried out in the furnace.

The invention will now be described in relation to a specific embodiment, wherein the same parts will be referred to the same numbers and wherein the FIG. 1 is a block diagram of an embodiment of the present invention, comprising mainly: a system for feeding and burning a pulverized fuel in at least a burner A of a glass melting furnace, of the type side-port, as will be describe later. Refractory means B formed in different shapes, for forming the walls and floor of regenerative chambers of a glass melting furnace, the refractory means being selected of a material with at least as 98% of magnesium oxide where the purity of the raw materials forming the refractory reducing the amount of calcium oxide present in the material and retarding the formation of a molten phase. This refractory in order to have the impurities surrounded by magnesium oxide must be sintered at high temperature created a ceramic bond in the main material. Other materials that can be used in the top checkers or regenerative chambers where the temperatures are as high as 1350 to 1450 celsius are the Zircon-silica-alumina fused cast materials which also present an acid behavior as the vanadium pentoxide reducing the impact of damage to the refractories. Another type of the refractory materials that can be used are those selected of a material containing of about of 80% magnesia and about 20% zirconium-silicate. Said materials being used for resisting the erosive forces of the melting glass, the corrosive action of combustion gases and the abrasive forces of particles in the atmosphere provoked by the burning of the pulverized fuel (petroleum coke) in the furnace. Finally, an environmental control system C is required for controlling the air pollution in a waste gas outlet after that the combustion of the pulverized fuel as been carried out in the furnace.

Making now reference to FIG. 2, the system for feeding and burning a pulverized fuel (A) will be connected to each burners 48a, 48b, 48c, 48d 48e, 48f, 48g and 48h, as well as, to each burners 50a, 50b, 50c, 50d, 50e, 50f, 50g and 50h (see FIGS. 3 and 5) for feeding and burning the pulverized petroleum coke within the a glass melting furnace. The system for feeding and burning a pulverized fuel (A) comprising in combination; a dosing system (D) for dosing the pulverized petroleum coke and, a combustion system (E) for burning the pulverized petroleum coke within the glass melting furnace. The dosing system (D) can be fed by a system for feeding and handling the pulverized petroleum coke (F), already known in the industry.

Figure 3:
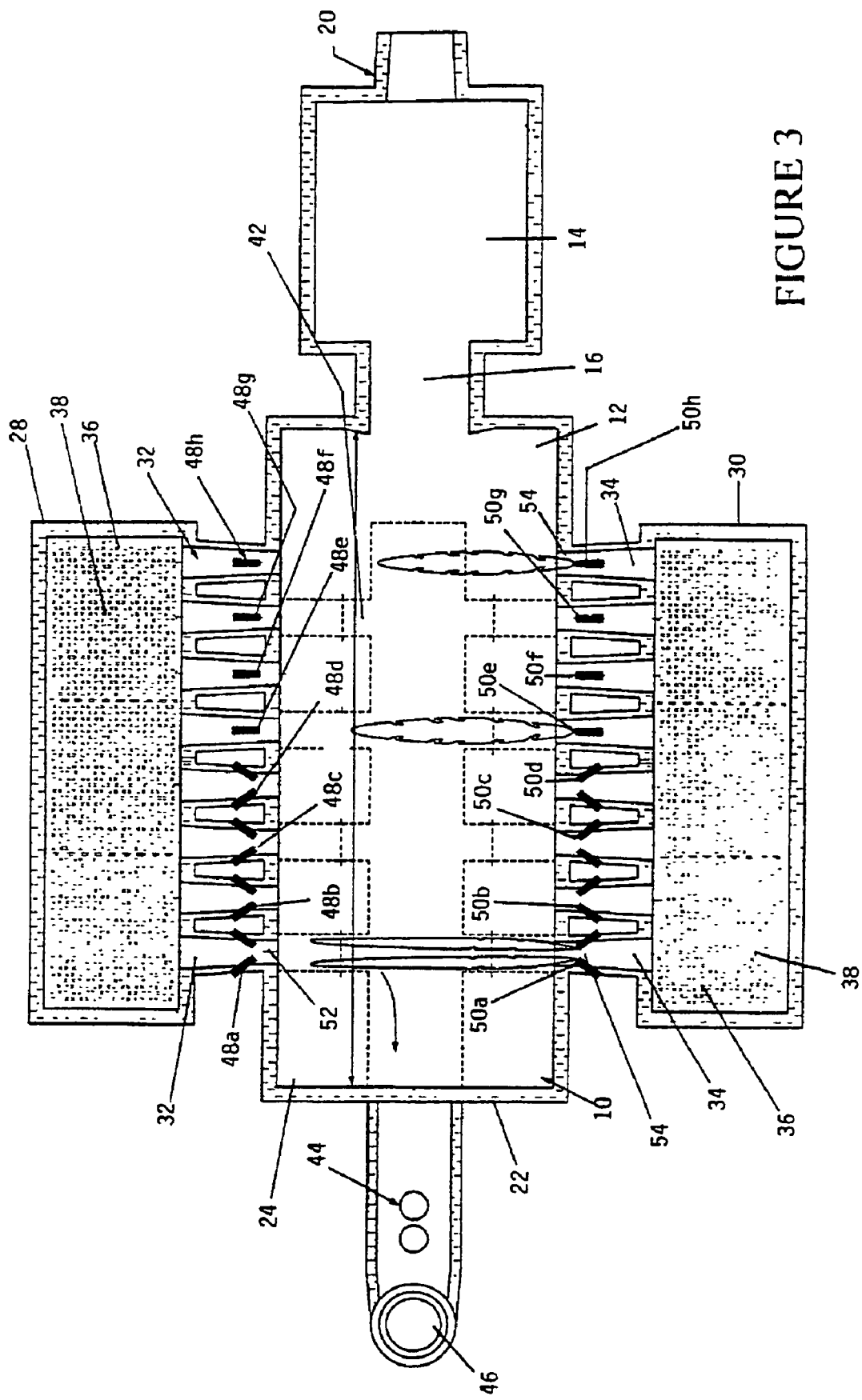
FIG. 3 is a plant view of a regenerative-type glass melting furnace.
Figure 4:
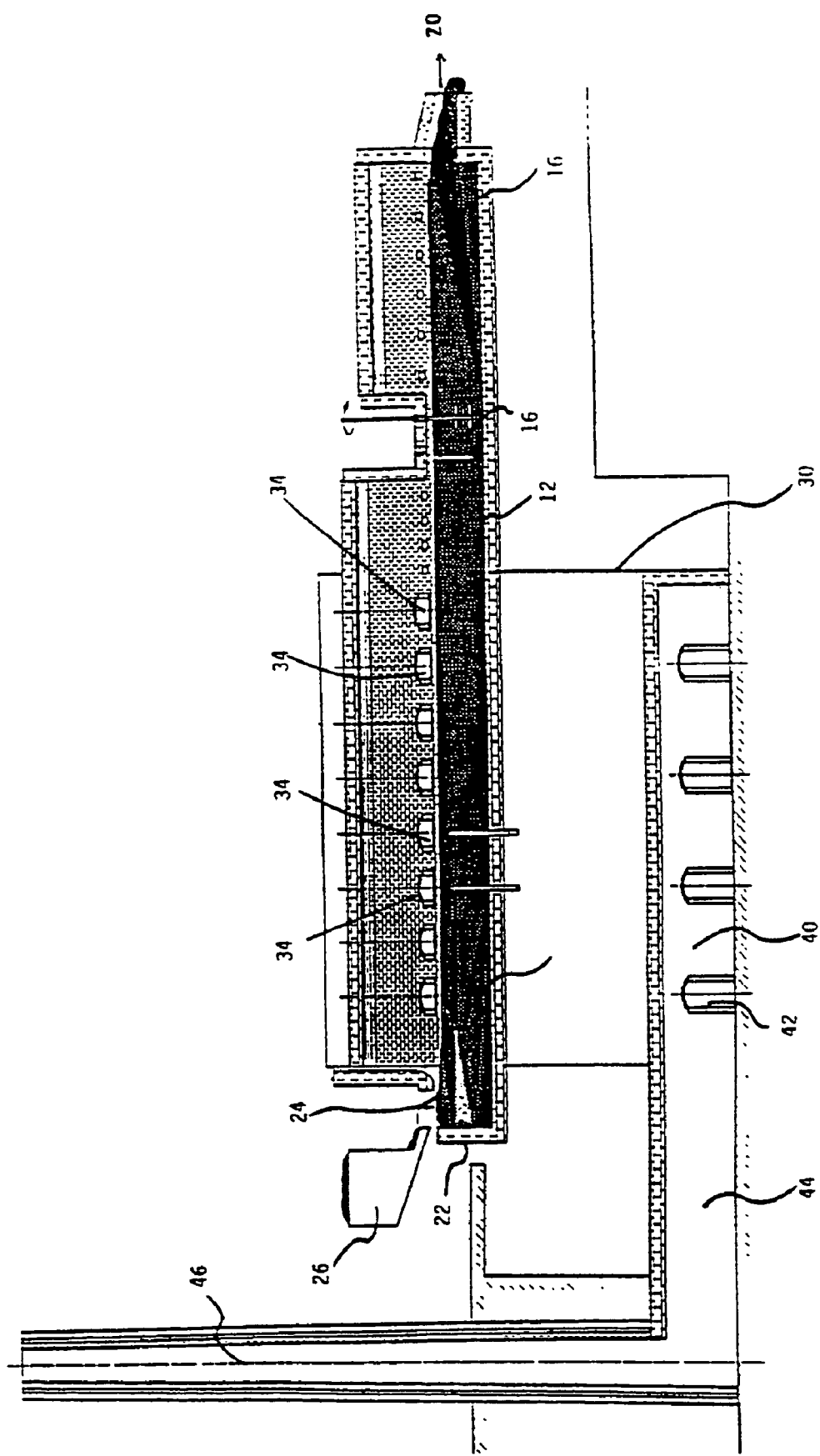
FIG. 4 is a schematic longitudinal view of the furnace illustrated in FIG. 1.

The system for feeding and burning a pulverized fuel (A) will now be described in relation with FIGS. 3 through 5, i.e. FIGS. 3 and 4 are schematic views of a regenerative-type glass melting furnace which comprises a melting chamber 10, a refining chamber 12, a conditioning chamber 14 and a throat 16 between the refining chamber 12 and the conditioning chamber 14. At a front end 18 of the refining chamber 12 comprises a series of forehearth connections 20 through which molten glass is removed from the refining chamber 12. The rear end 22 of the melting chamber 10 including a dog house 24 through which glass making materials are fed by means of a batch charger 26. A pair of regenerators 28, 30 are provided by each side of the melting chamber 10. The regenerators 28 and 30 are provided with firing ports 32, 34, connecting each regenerator 28, 30, with the melting chamber 10. The regenerators 28, 30 are provided with a gas regenerator chamber 36 and an air regenerator chamber 38. Both chambers 36 and 38 are connected to a lower chamber 40, which is arranged to be communicated by means of dampers 42 toward a tunnel 44 and a chimney 46 for the exhaust gases. Burners 48a, 48b, 48c, 48d 48e, 48f, 48g and 48h, as well as burners 50a, 50b, 50c, 50d, 50e, 50f, 50g and 50h are arranged by each port 32, 34, in a neck portion 52, 54, of each firing ports 32, 34 in order to burn fuel, as natural gas, petroleum coke or other type of fuels for use in the glass melting furnace.

So, when the glass making materials are fed through the dog house 24 in the rear end of the melting chamber 10, the melting glass is melted by the burners 48 a–h, 50 a–h, and floats in a forward direction until completely melting to pass from the melting chamber 10 to the conditioning chamber 14. During the operation of the furnace, the regenerators 28, 30 are cycled alternately between combustion air and exhaust cycles. Every 20 minutes, or 30 minutes, depending on the specific furnaces, the path of the flame of a series of burners 48a–h or 50a–h are reversed. So, the resultant flame and products of combustion produced in each burner 48a–h, 50a–h, pass across the surface of the melting glass, and transfer heat to that glass in the melting chamber 10 and refining chamber 12.

Feeding the Pulverized Petroleum Coke (F)

Figure 5:
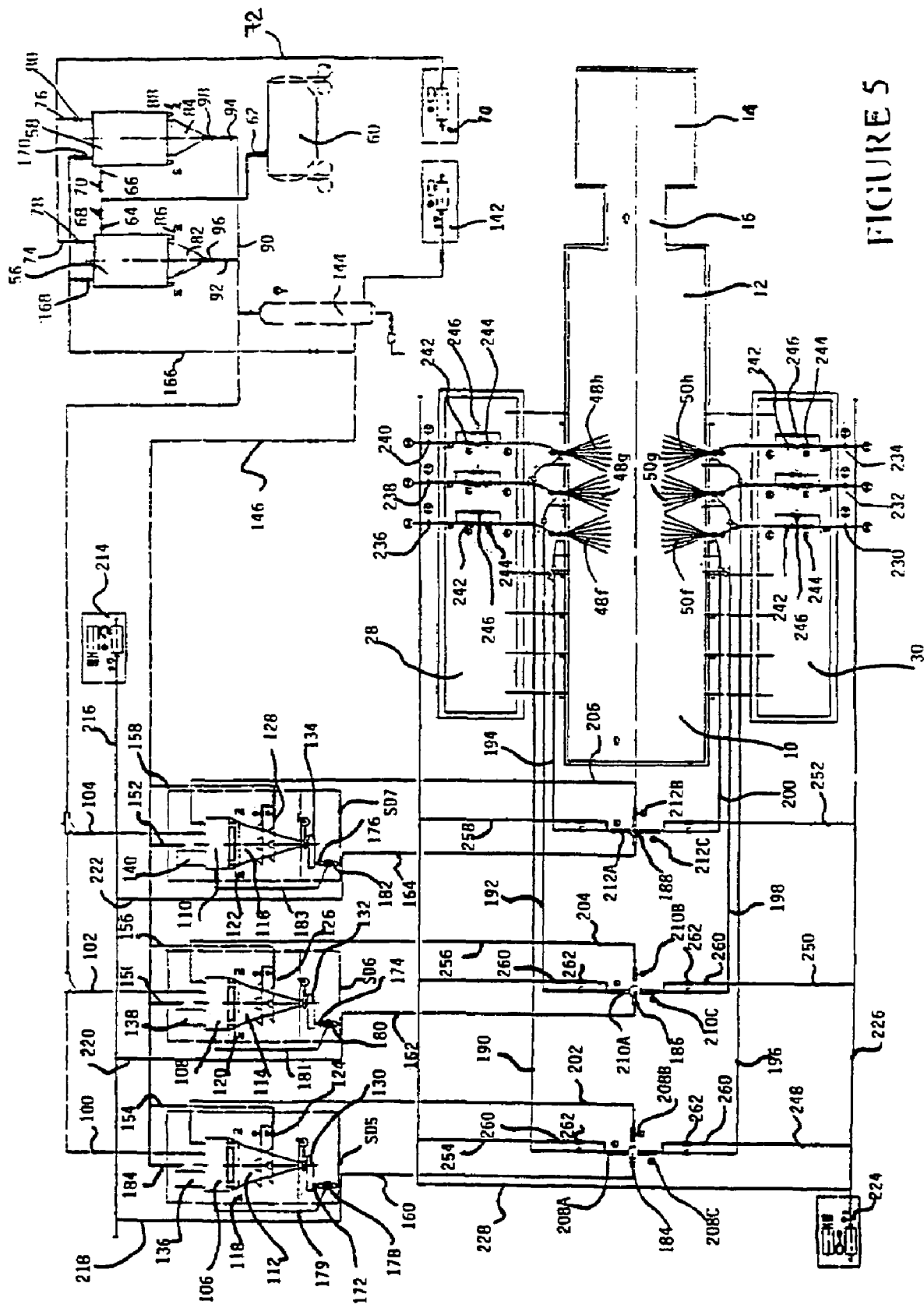
FIG. 5 is a schematic view of the system for feeding and burning a pulverized fuel in accordance with the present invention.
Figure 6:
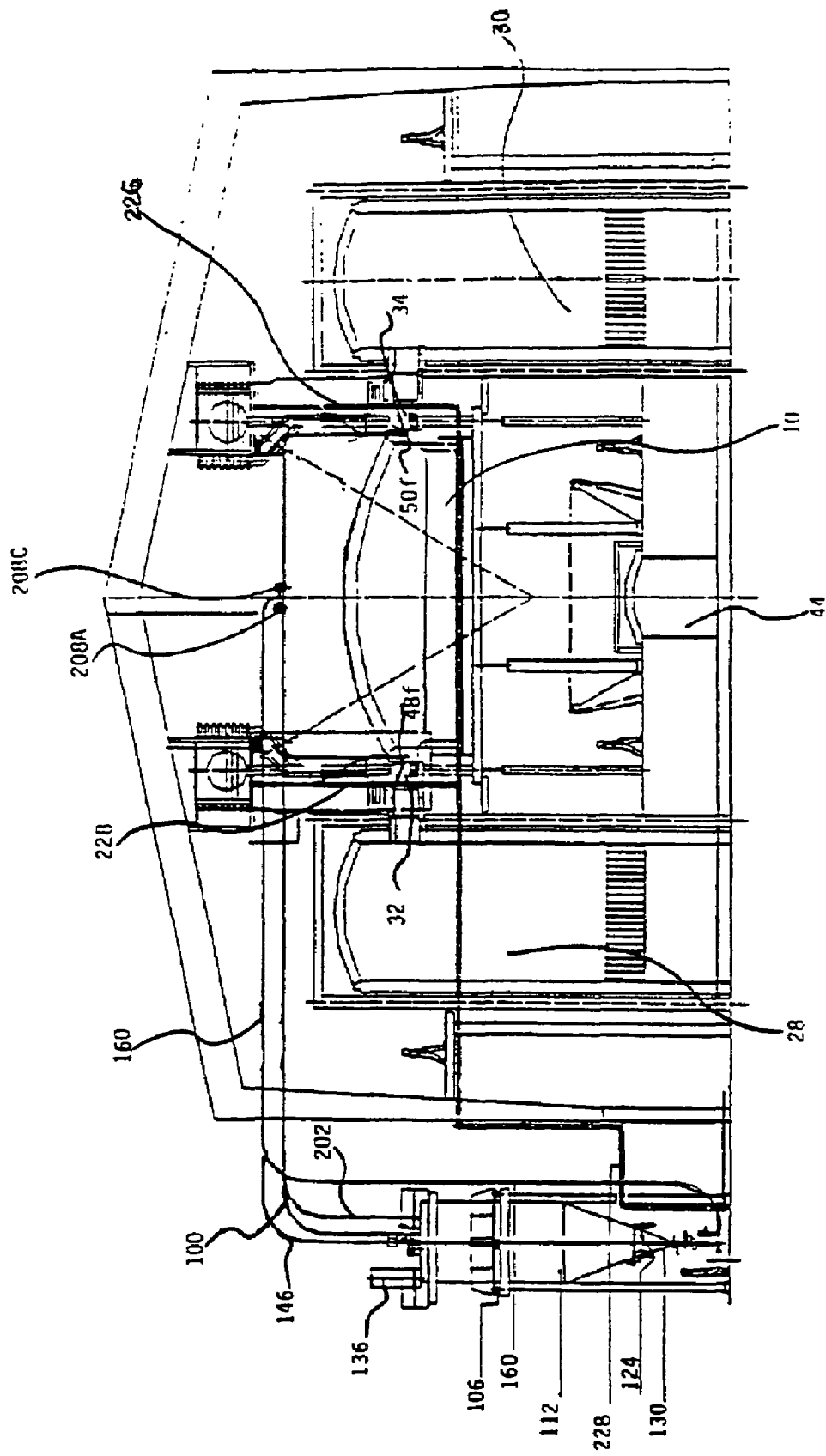
FIG. 6 is a lateral view of the system for feeding and burning a pulverized fuel in combination with the regenerative-type glass melting furnace.
Figure 7:
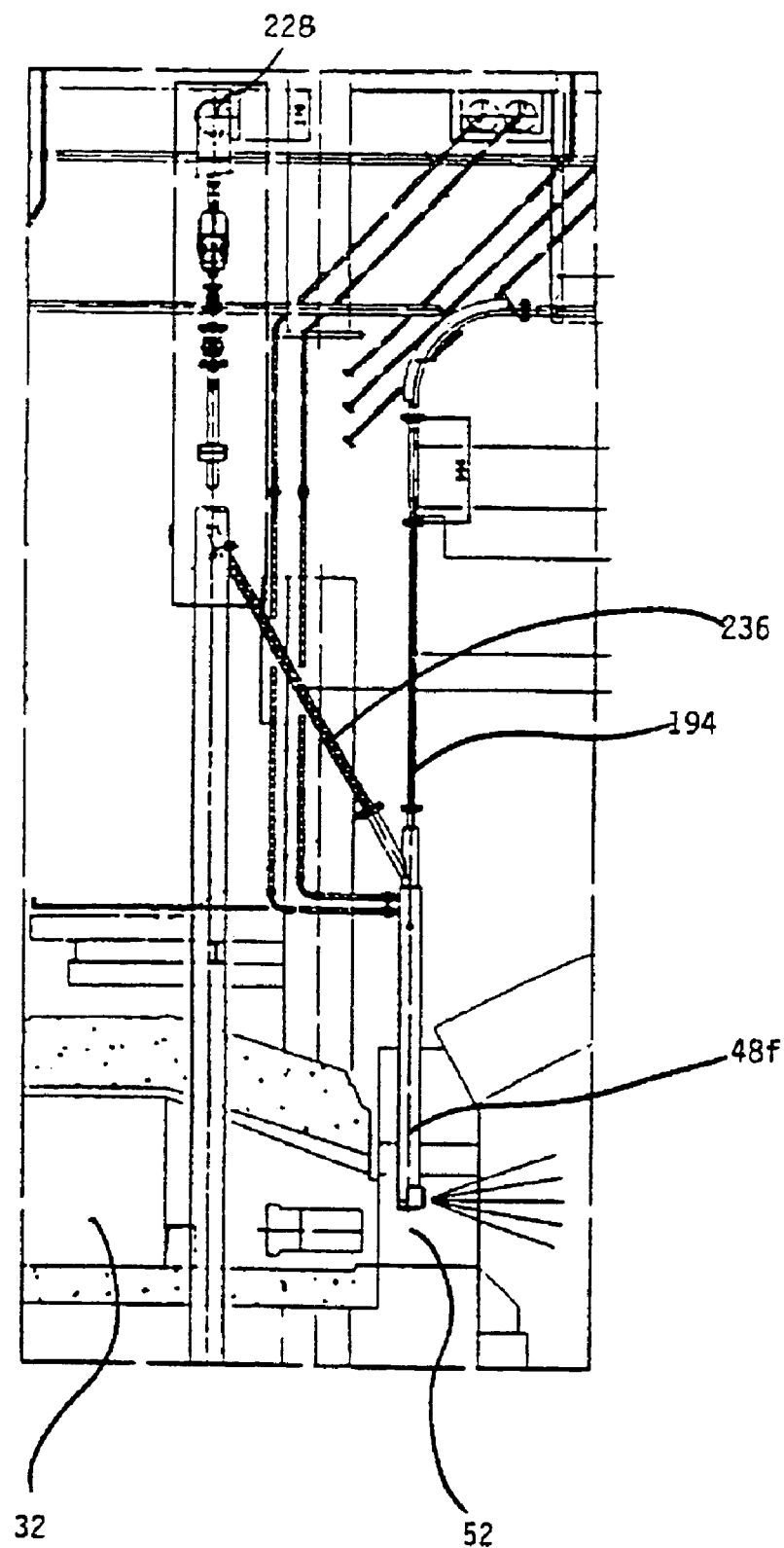
FIG. 7 is a detailed view of an arrangement of a burner for feeding and burning a pulverized fuel in accordance with the present invention.

Making now reference to FIGS. 5 and 6, the system for feeding and burning a pulverized fuel (A) in a glass melting furnace comprises in a first embodiment of the present invention, first storage silos or tanks 56 and 58 for store pulverized petroleum coke or other type of fuel for use in the glass melting furnace. The storage silos 56, 58 are fed through of a wagon or wagon train 60 by means of a first inlet pipe 62 connected between the wagon train 60 and the silos 56,58. The first main pipe 62 having first branch pipes 64, 66, which are connected respectively to each silo 56,58, for the filling of each silo 56,58. Valves 68, 70 are connected to each first branch pipe 64 and 66 to regulate the filling of each silo 56, 58. Each silo 56, 58 are filled by means of a vacuum effect through of a vacuum pump 70 by means of a first outlet pipe 72. The first outlet pipe 72 having second branch pipes 74, 76, to be connected with each silo 56,58. Valves 78, 80 are connected by each second branch pipes 74, 76, to regulate the vacuum effect provided by the vacuum pump 70 for the filling of each silo 56, 58.

At the bottom of each silo 56, 58, a conical section 82, 84, and a gravimetric coke feeding system 86, 88, are included for fluidizing and for assuring a constant discharge flow of the pulverized coke into a second outlet pipe 90 where the pulverized material is forwarded to a solid fuel dosing system SD-5, SD-6 and SD-7. The second outlet pipe 90 including a third branch pipes 92, 94, connected to the bottom of each conical section 82, 84 of each silo or tank 56, 58. Valves 96, 98, are attached to each third branch pipe 92, 94, to regulate the flow of the pulverized petroleum coke to the second outlet pipe 90.

Dosing System (D) for the Pulverized Petroleum Coke.

Making now reference to the dosing system (D) in accordance with the present invention, the pulverized petroleum coke is received in each solid fuel dosing system SD-5, SD-6 and SD-7 through the second outlet pipe 90. Fourth branch pipes 100, 102 and 104, are connected to the second outlet pipe 90, in order to transport the pulverized coke of the first silos or tanks 56 and 58 toward the solid fuel feeding system SD-5, SD-6 and SD-7. Each solid fuel feeding system SD-5, SD-6 and SD-7, including a second series of silos or tanks 106, 108, 110. The second series of silos 106, 108, 110, comprising a conical section 112, 114, 116; a gravimetric coke feeding system 118, 120, 122; an aeration system 124, 126, 128; a feeder 130, 132, 134; and a filter 136, 138 and 140, for discharging a constant flow of the pulverized coke toward each one of the burners 48f, 48g, 48h and burners 50f, 50g and 50h, as will be described later. A pneumatic air compressor 142 and an air tank 144 are connected by means of a second main pipe 146. A first inlet branch pipes 148, 150, 152, are connected with the second main pipe 146 for supplying a filtered air—through of the filters 136, 138 and 140—to transport the coke toward the interior of each second series of silos or tanks 106, 108, 110. The second main pipe 146 also includes a first return branch pipes 154, 156, 158, that are connected with each aeration system 124, 126, 128, for permitting an adequate flow of the coke toward a third outlet pipes 160, 162, 164, as will described later. Additionally, a second inlet pipe 166 is connected with the second main pipe 146—after of the air tank 144—, which includes second inlet branch pipes 168, 170, that are connected on the upper part of each silo or tank 56, 58, for injecting air toward the interior of each silo or tank 56, 58.

The solid fuel feeding system SD-5, SD-6 and SD-7 including fourth outlet pipes 172, 174, 176, connected below of each feeder 130, 132, 134. A three-way regulatory valve 178, 180, 182, is connected respectively with the fourth outlet pipes 172, 174, 176, through a first way; a second way is connected with first return pipes 179, 181, 183, for returning the excess of pulverized coke toward each second series of silos or tanks 106, 108, 110, whereas the third way is connected with the third outlet pipes 160, 162, 164, which are used to supply an air-fuel mixture toward an arrangement of a four-way pipe 184, 186 and 188 related with the combustion system (E) as be now described.

Combustion System (E)

Making now reference to the combustion system (E), this is connected to each solid fuel feeding system SD-5, SD-6 and SD-7 through of a first way of the four-way pipe 184, 186 and 188, which are connected with each third outlet pipes 160, 162, 164 of each solid fuel feeding system SD-5, SD-6 and SD-7. A second way is connected respectively with fourth outlet pipes 190, 192, 194, for feeding the supply air-fuel mixture toward the burners 48h, 48g and 48f. A third way of the four-way pipe 184, 186 and 188, is connected to fifth outlet pipes 196, 198, 200 for feeding the air-fuel mixture toward the burners 50h, 50g and 50f; and a four outlet of the four-way pipe 184, 186, 188, is connected respectively to second return pipes 202, 204, 206, for returning the excess of pulverized coke toward each of the second series of silos or tanks 106, 108, 110. The four-way pipe 184, 186 and 188 having ball valves 208 A to C, 210 A to C, 212 A to C, between a connection portion of the four-way pipe 184, 186 and 188 and the fourth outlet pipes 190, 192, 194; the fifth outlet pipes 196, 198, 200; and the second return pipes 202, 204, 206.

So in this way, during the operation of the furnace, the burners 48 $a$-to-$h$ or 50 $a$-to-$h$ are cycled alternately between combustion and non-combustion cycles. Every 20 minutes, or 30 minutes, depending on the specific furnaces, the path of the flame of a series of burners 48 $a$-to-$h$ or 50 $a$-to-$h$ are reversed. The air-fuel mixture that is arriving through the third outlet pipes 160, 162, 164, is regulated by the four-way pipe 184, 186 and 188 and ball valves 208 A-to-C, 210 A-to-C, 212 A-to-C, for alternating the injection of the air-fuel mixture between the burners 48 $a$-to-$h$ and 50$a$-to-$h$. When the alternately operating cycle between the burners 48 $a$-to-$h$ and 50 $a$-to-$h$ is carried out, an amount of air-fuel is returned to the second series of silos or tanks 106, 108, 110 by means of the second return pipes 202, 204, 206.

The supply air that is supplied through the third outlet pipes 160, 162, 164, is used for transporting the petroleum coke and for provoking high velocities of coke injection toward the nozzle of the each burner 48 $a$-to-$h$ and 50$a$-to-$h$. The supply air is supplied by means of a pneumatic supply air blower 214 through a third main pipe 216.

Fourth outlet pipes 218, 220 and 222 are connected with the third main pipe 216 and the third outlet pipes 160, 162, 164, for maintaining an elevated relation of the fuel-air mixture that is being supplied to the burners 48 $a$-to-$h$ and 50$a$-to-$h$.

For effectuating the combustion cycle of the burners 48 $a$-to-$h$ or 50 $a$-to-$h$, each burner 48 $a$-to-$h$ or 50$a$-to-$h$ are fed individually with the air-fuel mixture. This mixture will supplied through an internal tube of each burner 48$a$–$h$ or 50$a$–$h$, and will arrive to a distribution chamber to be distributed to the diverse injection nozzles of each burner 48$a$–$h$ or 50$a$–$h$.

For increasing the turbulence of the flows and the mixture of the pulverized fuel with a pre-heated combustion air in each burner 48$a$–$h$ or 50$a$–$h$, a primary air is injected from a primary air blower 224, which is supplied under pressure through of the injection nozzles of each burner 48$a$–$h$ or 50$a$–$h$. So, the operation of the burners 48$a$–$h$ or 50$a$–$h$, will have a injection of coke through of pneumatic transportation with an elevated relation solid-air and with an relation of primary air of approximately 4% of a stoichiometric air.

A sixth outlet pipe 226 and a seventh outlet pipe 228 is connected with the primary air blower 224. The sixth outlet pipe 226 being connected with fifth branch pipes 230, 232, 234 and the seventh outlet pipe 228 being connected with sixth branch pipes 236, 238, 240. The exit end of each fifth and sixth branch pipes 230, 232, 234, 236, 238, 240, being connected in a direct way with each burner 48 $f$-to-$h$ or 50 $f$-to-$h$. The flow of primary air in each fifth and sixth branch pipes 230, 232, 234, 236, 238, 240, are regulated individually by an arrangement of a first glove valve 242, a first ball valve 244 and a second glove valve 246.

Additionally, the sixth outlet pipe 226 includes seventh outlet pipes 248, 250 and 252, which are connected respectively with the fifth outlet pipes 196, 198, 200. And, the seventh outlet pipe 228 includes sixth outlet pipes 254, 256, 258, which are connected respectively with the fourth outlet pipes 190, 192, 194. Each sixth and seventh outlet pipes 248, 250, 252, 254, 256, 258, having a check valve 260 and a ball valve 262.

Through the arrangement above described, the primary air blower 224 will supply primary air to the burners 48$f$-to-$h$ (left burners) or burners 50 $f$-to-$h$ through the sixth outlet pipe 226 and the seventh outlet pipe 228 and by each fifth and sixth branch pipes 230, 232, 234, 236, 238, 240. The air blower 224 will operate to supply a maximum air flow during the operation of each burner 48 $f$-to-$h$ or burners 50 $f$-to-$h$, meanwhile a minimum air flow will be provide for the burners 48 $f$-to-$h$ or burners 50 $f$-to-$h$ that are not operating by means of each sixth and seventh outlet pipes 248, 250, 252, 254, 256, 258, to guarantee the better conditions to be cooled.

Notwithstanding that the invention was described over the basis of three burners 48$f$, 48$g$, 48$h$ and burners 50$f$, 50$g$ and 50$h$, should be understood that the system described in the present invention is applied for all the burners 48 $a$-to-$h$ and 50 $a$-to-$h$.

In an additional embodiment of the present invention, the melting of glass can be melted with two or three types of fuel, for example, in FIG. 3, the burners 48$a$–48$d$ and 50$a$–50$d$ can be fed with a pulverized fuel as petroleum coke; and the burners 48$e$–48$h$ and 50$e$–50$h$ can be fed with gas or fuel oil. In a third embodiment of the present invention, the burners 48$a$–48$d$ and 50$a$–50$d$ can be fed with a pulverized fuel as petroleum coke; the burners 48$e$–48$f$ and 50$e$–50$f$ can be fed with gas; and the burners 48$g$–48$h$ and 50$g$–50$h$ can be with fuel oil. These combinations are considering that at this date already exists glass melting furnaces that uses gas or fuel oil as the main fuel for melting glass, and that the behavior of said gas and fuel oil is well known in the art.

Pulverized Fuel Burner

Additionally, for carrying out a good combustion of the pulverized petroleum coke, a special burner was designed to be used with the system for feeding and burning the pulverized fuel in the glass melting furnace. Said burner generating a low amount of NOx, due to that the adiabatic temperature of the flame of the pulverized fuel (between about 1900 to 2000° C.), is less that the adiabatic temperature of the gas in the same operation conditions, generating volant ashes that does not affect the glass quality.

Figure 8:
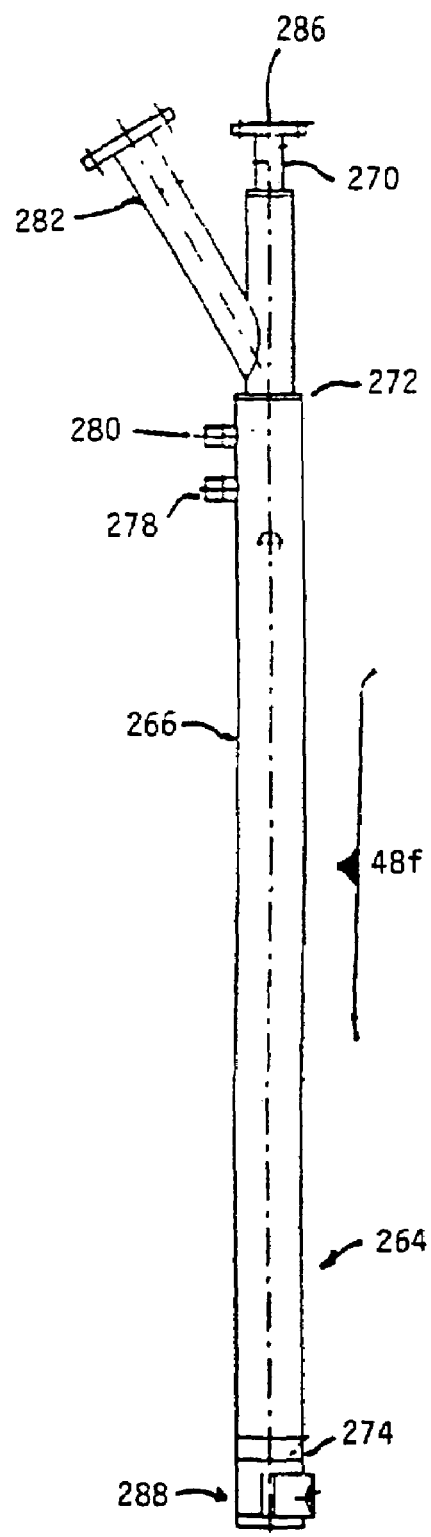
FIG. 8 is a side view, which is taken of FIG. 7, in a preferred embodiment of a burner for burning pulverized petroleum coke in accordance with the present invention.
Figure 9:
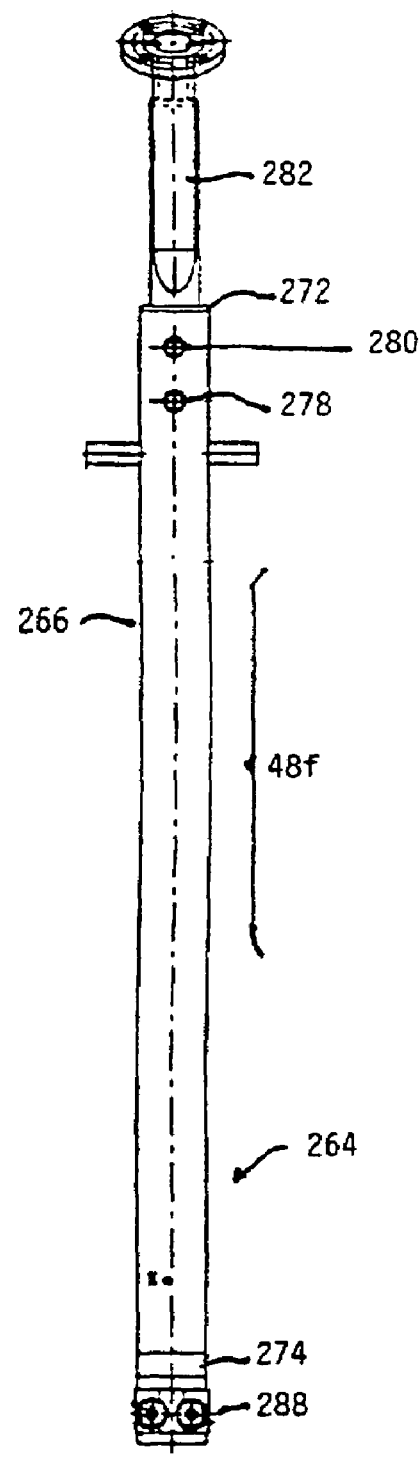
FIG. 9 is a front view, which is taken of FIG. 8.

The FIGS. 7 through 12 shows a detailed view of the burner (48$f$) for feeding and burning a pulverized fuel in accordance with the present invention. The pulverized fuel burner (48$f$) comprising a main body 264 constructed of an outer pipe 266, an intermediate pipe 268, and a inner pipe 270 (FIG. 10), which are disposed concentrically one with the other. The outer pipe 266 being closed in the upper end 272 (FIG. 9). A first chamber 276 is formed in the space defined by the outer pipe 266 and the intermediate pipe 268. The outer pipe 266 having an inlet pipe 278 and an outlet pipe 280 (FIG. 8) through which cooling water is introduced in the first chamber 276 for the cooling of the burner (48f). The intermediate pipe 268 and the inner pipe 270 being extended beyond of the upper end 272 of the outer pipe 266.

On the upper part of the burner 48f, an air inlet pipe 282 is connected in a inclined form around the intermediate pipe 268, in order to be connected with the sixth branch pipe 236 (see FIG. 7) for introducing a flow of primary air or natural gas in a second chamber 284 formed in the space defined by inner pipe 270 and the intermediate pipe 268. The second chamber 284 serves to direct the primary air or natural gas from the air inlet pipe 236 (FIG. 7) and is conveyed to the lower end of the burner 48f. The flow of primary air in the second chamber 284 is regulated by the arrangement of the first glove valve 242, the first ball valve 244 and the second glove valve 246.

In the same way, a mixture of secondary air and pulverized petroleum coke is introduced in an upper end 286 of the inner pipe 270 and is conveyed to the lower end of the burner 48f. The upper end 286 of the inner pipe 270 is connected respectively with the fourth outlet pipe 194 for feeding the supply pulverized fuel-secondary air mixture toward said burner (48f). So, when the primary air and the mixture of secondary air and pulverized petroleum coke reaches the lower end of the burner (48f), the primary air or gas natural and the mixture of pulverized fuel-secondary air are mixed to ignite a combustion process, as will now described.

Figure 10:
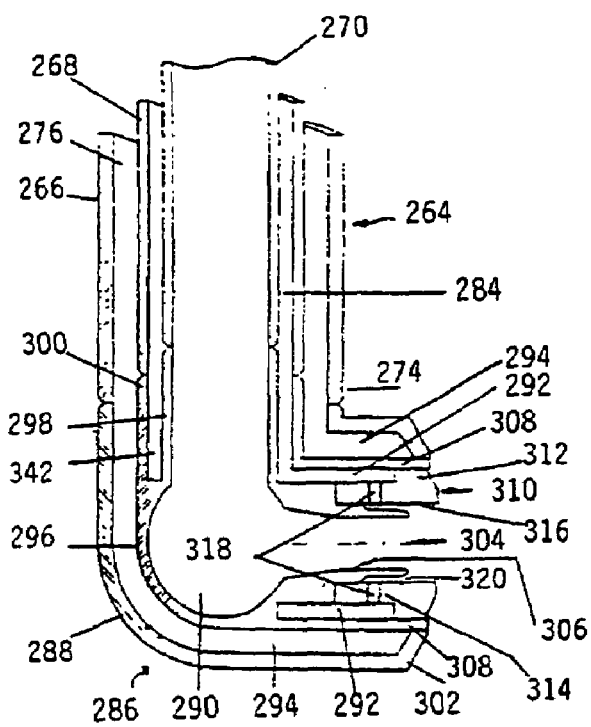
FIG. 10 is a detailed view of vertical sectional of the burner of FIG. 8.
Figure 12:
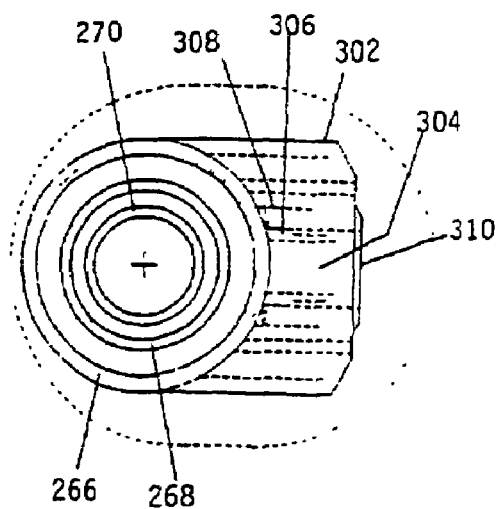
FIG. 12 is another plant view showing the burner of the second embodiment with one exit nozzle.
Figure 11:
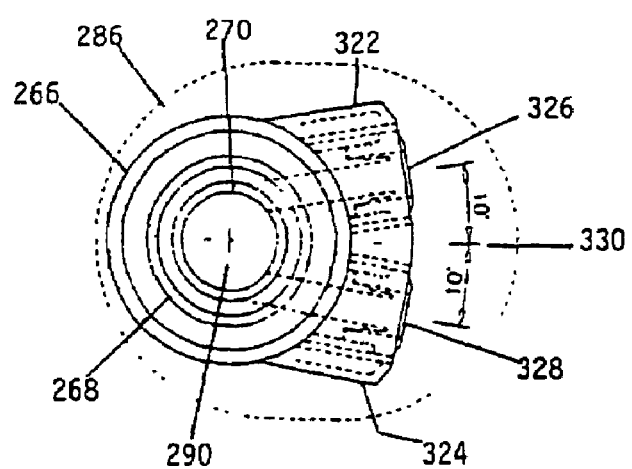
FIG. 11 is plan view which was taken along the line "A—A" of FIG. 10, showing the burner with two exit nozzles.

Making now reference to FIGS. 10 through 12 these are showing a detailed view of an embodiment of the burner (48f) for feeding and burning a pulverized fuel in accordance with the present invention.

Basically, the burner (48f) [FIG. 10] comprises a main body 264 constructed of an outer pipe 266, an intermediate pipe 268, and a inner pipe 270, which are disposed concentrically one with the other. A first chamber 276 is formed in the space defined by the outer pipe 266 and the intermediate pipe 268. The outer pipe 266 having an inlet pipe 278 and an outlet pipe 280 through which cooling water is introduced in the first chamber 276 for the cooling of the burner (48f).

A second chamber 284 for introducing a flow of primary air or gas, which is formed in the space defined by inner pipe 270 and the intermediate pipe 268. The second chamber 284 serves to direct primary air or gas from the air inlet pipe 236 (FIG. 7) and is conveyed to the lower end of the burner 48f. In the same way, a mixture of secondary air and pulverized petroleum coke is introduced in an upper end 286 of the inner pipe 270 and is conveyed to the lower end of the burner 48f.

Making now reference particular to FIGS. 10 through 12, the lower end 274 of the burner (48f) includes a flow distributor 286 for receiving and distributing simultaneously the primary air or gas and the secondary air-pulverized fuel. The flow distributor 286 (FIG. 11) is connected below the lower end 274 of the burner (48f) and includes a main body 288 defining a first distribution chamber 290 for receiving a mixture of the secondary air-pulverized fuel; a second distribution chamber 292 for receiving the flow of the primary air or gas; and a third chamber 294 surrounding a section of the first distribution chamber 290 and a section of the second chamber 292 through which cooling water is introduced in the third chamber 294 for the cooling of the burner (48f). The first chamber 290 being defined within a semi-spherical wall 296. The semi-spherical wall 296 having formed by the upper part, a first inner annular sleeve 298, which is connected with the lower end of the inner pipe 270 and an intermediate annular sleeve 300, which is connected with the lower end of the outer pipe 268, defining the secondary chamber 342, through which primary air or gas is made to flow.

The flow distributor 286 also includes a discharge end 302, located in a 90° position with respect to the semi-spherical wall 296 of the main body 288, in order to deviate the flow of the primary air or gas and the secondary air-pulverized fuel mixture from a vertical flow to a longitudinal flow. The discharge end 302 includes a passage 304 (FIGS. 10 and 12), which are formed longitudinally in the main body 286 connecting the first distribution chamber 290 with the outer periphery of said body 286. The passage 304, being formed by a first inner annular section 306, through which flows the pulverized fuel-secondary air mixture. The first annular section 306 being internally formed in a frusto-conical form, with a diameter less in the front of each passage. And a second intermediate annular section 308 surrounding the first inner annular section 306 through which primary air or gas is made flow. The first inner annular section 306 and the second intermediate annular section 308 defining en entrance for receiving a nozzle 310 for mixing at the same time the primary air or gas, as well as, the secondary air-pulverized petroleum coke mixture within the chambers of the glass melting furnace. Finally, the periphery of the main body 288 and the second intermediate annular section 308 defining the third chamber 294 to make flow water for the cooling of the burner (48f).

Now making reference to the nozzle 310, this includes a cylindrical head 312 and a cylindrical member 314 located in the rear part of the head 362. The cylindrical member 314 including a central orifice 316 and at least a plurality of orifices 318, which crosses transversally the periphery of the cylindrical member 314. The cylindrical member 314 is introduced in the entrance defined by the first inner annular section 306 and the second intermediate annular section 308, forming a closed section in the second chamber 292. When the cylindrical member 314 is introduced in said entrance, the plurality of orifices 318 are situated in coincidence with the second chamber 292 for allowing an exit flow of the primary air or gas out the flow distributor 286. A first annular recess 320 is defined between the first inner annular section 306 and the internal part of the cylindrical member 314, for deviating the flow of the primary air or gas toward the frontal part of the flow distributor 286.

In a third embodiment of the burner (FIG. 11), the flow distributor 286 is showed with two discharge ends 322, 324, located in a 90° position with respect to the main body 288. Nozzles 326, 328 are introduced by each one of the discharge ends 322, 324. The position of the discharge ends 322, 324, being separated with an angle approximate from about 10° to about 20° between each other with respect to a longitudinal axis 330.

Now, in accordance with the burner (48f) showed in FIGS. 8 and 10, the primary air enters through the air inlet pipe 282 and introduces the flow of primary air or gas in the second chamber 284 formed in the space defined by inner pipe 270 and the intermediate pipe 268. After, the flow of primary air or gas continues through the second distribution chamber 342 to be expelled out through of the plurality of orifices 318 of the nozzles 310 or 326 and 328.

Simultaneously, the mixture of secondary air and pulverized petroleum coke is introduced in the upper end 286 through of the inner pipe 270 and is conveyed to the first distribution chamber 290 and from this section, the mixture flows into the passage 304 of the flow distributor 286. The mixture is fed through the passage 304 in an axial direction to be introduced into the chambers of the glass melting furnace. The primary air or gas and the mixture of secondary air and pulverized petroleum coke are simultaneously burned at the exit of the nozzle 310 or nozzles 326 and 328.

Cooling water is continuously introduced through the first chamber 276 and the third chamber 294 for cooling the burner.

Figure 13:
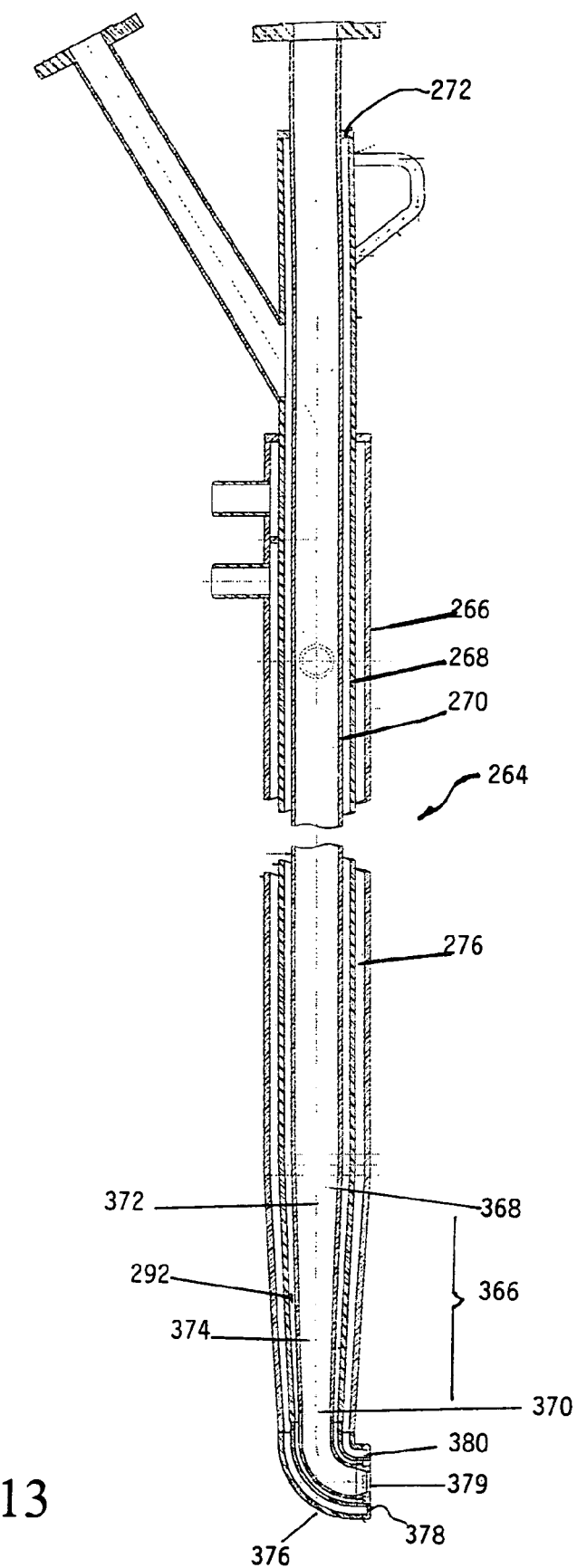
FIG. 13 is a side detailed view of a third embodiment of a burner for burning pulverized petroleum coke in accordance with the present invention.
Figure 17:
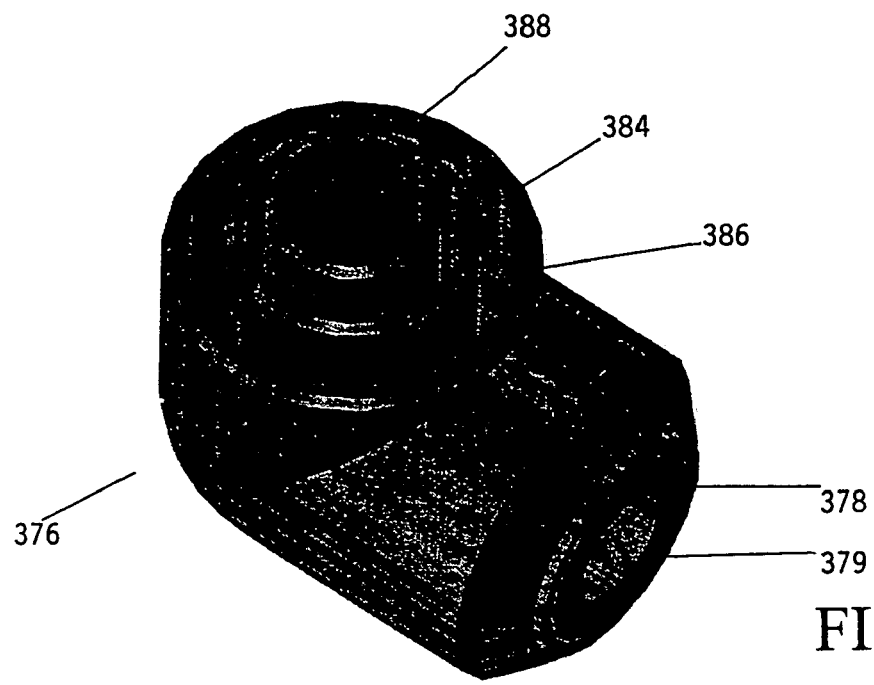
FIG. 17 is a perspective view of a section of the burner illustrated in FIG. 16.
Figure 18:
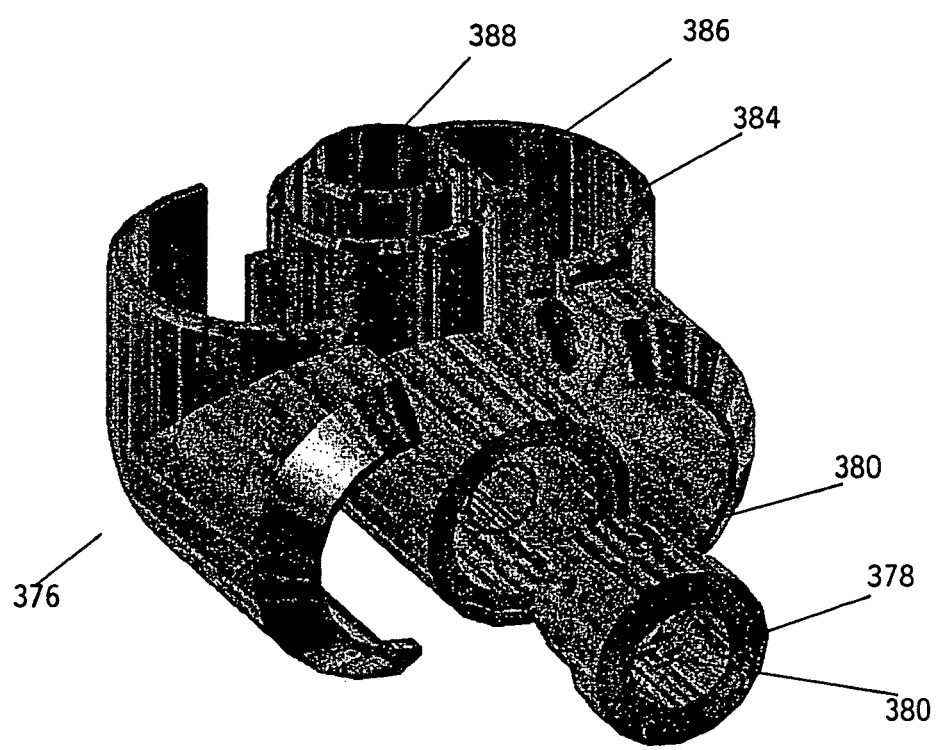
FIG. 18 is an exploded view of the section of burner illustrated in FIG. 17.

Regarding to the FIG. 13, this shows a detailed view of the burner (48*f*) for feeding and burning a pulverized fuel in accordance with the present invention. In this third embodiment the burner 48 (*f*) illustrated in FIG. 13 including an enlarged conical section 366, which is uniformly reduced from a first section 368 to a second section 370 in the body of said burner 48 (*f*). Said second section 370 being connected to a flow distributor 376 in the lower part of the burner 48 (*f*). In this case, the velocity of the air or gas and pulverized mixture is increased due to the reduction in the burner (48*f*) from a major diameter 372 to a minor diameter 374. The flow distributor 376 having curvature—similar to an elbow of 90° (FIG. 16)—, said flow distributor being connected to the lower part of the burner 48 (*f*) to gradually change the flow trajectory of the pulverized solid fuel-secondary air mixture and primary flow from a vertical flow to a longitudinal flow, and also to make uniform the exit flow of the pulverized fuel-secondary mixture in a nozzle 378, as will now described. A nozzle 378 is connected to the exit end of the flow distributor 376. Said nozzle 378 including a central orifice 379 through which flows the pulverized fuel-secondary air mixture, and a series of orifices 380, in coincidence with the second chamber 292—formed between inner pipe 270 and the intermediate pipe 268—allowing an exit flow of the primary air or gas out the flow distributor 376. The series of orifices 380 in coincidence with the second connecting chamber 292 can be placed in a parallel relation with respect to the exit flow of the pulverized fuel-air mixture. In a second embodiment (FIG. 18), the orifices 380 are formed in an angular position in said nozzle 378 to provide a swirl effect to the first flow of air and by consequence to said pulverized fuel-air mixture. In this way, the primary air and the pulverized fuel-secondary air mixture reaches the lower end of the burner (48*f*), and these are mixed at the exit end of the nozzle 378 to ignite a combustion process within the glass furnace. This arrangement having an operation range from about 400 to 1300 kg/hr, and a pulverized fuel-air relation from 1 to 3.25 and with a transporting air velocity of at least 18 m/seg. Additionally, the burner uses preheated air from about 1200° C., to improve the complete combustion of the pulverized fuel within the furnace.

The FIGS. 14, 15, 16, 17 and 18, shows a fourth embodiment of the burner (48 *f*) of the present invention, in which a short conical section 382 is formed in the lower end of the burner (48 *f*), in order to uniformly reduce the diameter of the inner pipe 270, the intermediate pipe 268 and the outer pipe 266. The flow distributor 376 (FIG. 16) having the form of a 90° elbow, to change the direction of the flow trajectory of the pulverized fuel-secondary air mixture and air primary from a vertical flow to a horizontal flow. The flow distributor 376 comprising an outer cylindrical body 384, and intermediate cylindrical body 386, and an inner cylindrical body 388, which are concentrically arranged between each other, said flow distributor 376 being connected respectively with the lower end of the inner pipe 270, the intermediate pipe 268 and the outer pipe 266 of the main body 264. The space defined between the outer wall 384 and intermediate wall 386 defining a chamber 390 through which cooling water is made flow. In the same way, the space define between the intermediate wall 386 and the inner wall 388 defining a chamber 392 to receive the flow of primary air or gas that is being supplied from the second chamber 284 (FIG. 14) to be mixed with the pulverized fuel-secondary air mixture at the exit end of the nozzle 378.

Finally the FIGS. 19, 20 and 21 shows a fifth embodiment of the burner 48*f*, wherein the flow distributor 376 is bifurcated in two discharge ends 394, 396. In this case the discharge ends 394, 396, are angularly separated from each other between approximately 10° to 20°. Nozzles 398, 400 are placed by each one of the discharge ends 394, 396. The discharge ends 394, 396, providing a proportional division to produce uniform and regular flows, to enlarge the flame and by consequence a better distribution of the heat transfer in the glass.

In accordance with the above, a method for feeding and burning a pulverized fuel in a glass melting furnace of type including a glass melting region lined with refractory material and a plurality of burners associated with sealed regenerators in the glass melting furnace, which act as heat exchangers, the method comprising;

supplying a pulverized fuel of the type comprising fixed carbon and impurity materials of sulfur, nitrogen, vanadium, iron and nickel or mixture of the same to each one of said burners associated with the sealed regenerators of said glass melting furnace, said pulverized fuel being fed directly to the furnace in a relation fuel-air of about 16% of air in excess with respect to a stoichiometric air;

burning said pulverized fuel by each one of said burners in the melting region of said melting furnace, providing a flame for each burner to carry out a combustion process in said melting region for the melting of the glass;

controlling emissions of carbon and impurity materials produced by the burning of said pulverized fuel with environmental control means, said environmental control means being located in a waste gas outlet of said glass melting furnace, in order to clean the flue gases and reducing the emission of impurities from the pulverized fuel such as SOx, NOx and particulates, said reduction of emissions being controlled during and after that the combustion of the pulverized fuel in the glass melting furnace has been carried out; and, counteracting erosive and abrasive effects of the pulverized fuel in the glass melting furnace by means of refractory means, said glass melting furnace being constructed with said refractory means for controlling said erosive and abrasive effects produced by the burning of said pulverized fuel in said furnace.

The method also comprises the steps of:

feeding a pulverized fuel material toward a series of distribution means;

fluidizing the pulverized fuel material within the series of distribution means;

discharging the fluidizing pulverized fuel material from the series of distribution means toward at least a main pipe;

mixing the fluidizing pulverized fuel with a first flow of primary air for discharging a constant flow of the pulverized fuel toward the main pipe;

distributing the mix of fluidizing pulverized fuel and the primary air in at least two distribution pipes, to supply the fuel-primary air mix by each one of the two distribution pipes in an alternatively operating cycle;

supplying the fuel-air mix from each two distribution pipes to a first series of burners and to a second series of burners of a melting furnace, for operating said first and second burners in an alternately operating cycle between a combustion and non-combustion cycle; and, supplying simultaneously a second flow of air by each one of the first and second burners, to maintain a better combustion cycle by each one of said burners.

Wherein the step of supplying a second flow of air by each one of the first and second burners comprises the step of providing simultaneously by each burner, an internal flow of the fluidizing pulverized fuel and the first air, and an external flow of the second flow of air.

Environment Control

Finally, after of the combustion of the pulverized fuel in the glass melting furnace has been carried out, an equipment for reducing and controlling the air pollution and emissions of sulfur, nitrogen vanadium, iron and nickel compounds at the atmosphere is placed at the end of the tunnel 44 and connected with the chimney 46 for the exhaust gases. The pollution control system according to the present invention is adapted in a waste gas outlet of the glass melting furnace.

For the control of contaminant emissions, electrostatic precipitators have proven to perform well in the abatement of glass furnace particulate matter. The fine particulate matter of glass furnaces presents no problem for electrostatic precipitators.

In the case where $SO_2$ removal is needed in addition to particulate matter, a dry or partially wet scrubber makes a good complement to an electrostatic precipitators or a fabric filter system. In fact, under the conditions of high acid gas, a scrubber is necessary to reduce the concentration of the corrosive gases. In the case of the use of a new fuel, a scrubber will be needed to lower $SO_2$ content. It will not only serves as a benefit to the system for corrosion prevention, but it will also lower the temperature of the exhaust and therefore reduce the gas volume.

Dry scrubbing (the injection of a dry reactive powder) and semi-wet scrubbing will take place in a large reaction chamber upstream of the electrostatic precipitators. In both dry and wet, the scrubbing materials will include $Na_2CO_3$, $Ca(OH)_2$, $NaHCO_3$, or some others. The resultant reaction materials are basic ingredients to the glass making process and therefore are generally recyclable up to a point. A rule of thumb is that for every 1% of sulfur in the fuel, there will be about 4 pounds of $SO_2$ generated per ton of glass melted. So, for high sulfur fuels there will be an abundance of dry waste, $NaSO_4$ for example. This amount of waste will vary with the capture rate and the amount of material that can be recycled, but the number will be significant. For the float furnace operating with high sulfur fuel there might be up to 5 tons of waste per day.

The performance levels of scrubbing vary from 50% to 90% using dry $NaHCO_3$ or semi-wet $Na_2CO_3$. Temperature control is important in all scrubbing alternative with target reaction temperatures ranging from about 250° C. to 400° C. on the scrubbing material.

Wet scrubbers come in an almost infinite number of shapes, sizes and applications. The two major applications, relating to glass making are those that are designed to collect gases ($SO_2$), and those that are designed to capture particulate matter.

From the above, a system for feeding and burning a pulverized fuel in at least a burner of a glass melting furnace has been described and will apparent for the experts in the art that many other features or improvements can be made, which can be considered within the scope determined by the following claims.

We claim:

1. A burner for burning a pulverized fuel for use in a glass melting furnace, which comprises:
    a main body including:
        an outer pipe;
        an intermediate pipe; and
        an inner pipe;
        said pipes being concentrically arranged one with the other, said outer pipe and said intermediate pipe forming a first pipe chamber;
        said outer pipe including an inlet pipe and an outlet pipe for introducing and for circulating a cooling fluid within said first pipe chamber for the cooling of the burner;
        said intermediate pipe including a first inlet for introducing a first flow of air or gas in a second pipe chamber, said second pipe chamber being defined between said inner pipe and said intermediate pipe;
        said inner pipe including a second inlet for introducing a flow of a pulverized fuel-air mixture through said inner pipe;
    flow distribution means having their entrance end connected in alignment with a lower end of said main body, said flow distribution means having a curvature to uniformly change the flow trajectory of said pulverized fuel-air mixture and said first flow of air or gas, said distribution means including:
        an outer cylindrical body;
        an intermediate cylindrical body;
        an inner cylindrical body, with said outer cylindrical body and said intermediate cylindrical body defining a first connecting chamber for circulating the cooling fluid of said main body for the cooling of the flow distribution means, said inner cylindrical body and said intermediate cylindrical body defining a second connecting chamber for receiving and for changing the flow trajectory of the first flow of air or gas of said second pipe chamber of said main body; and
        a main fluid chamber for receiving and for conveying the mixture of pulverized fuel-air out to at least a discharge end of said flow distribution means to be mixed with the first flow of air or gas in a combustion zone of the glass melting furnace; and
    a discharge nozzle connected by each discharge end, said discharge nozzle including:
        ahead;
        a cylindrical member coupled in the rear part of said head, said cylindrical member having:
            a central orifice; and
            at least one plurality of peripheral orifices formed in the periphery of said cylindrical member, said at least one plurality of peripheral orifices being formed transversely around the periphery of the cylindrical member to provide communication between the second connecting chamber and the central orifice of said discharge nozzle.

2. The burner as claimed in claim 1, wherein the at least one plurality of peripheral orifices of the cylindrical member are formed in a perpendicular form with respect to the cylindrical member.

3. The burner as claimed in claim 1, wherein the at least one plurality of peripheral orifices of the cylindrical member are formed tangentially with an angle in the range from 0 to 15 degrees, to produce a swirl effect of the first flow of air or gas around the pulverized fuel-air mixture.

4. The burner as claimed in claim 1, wherein the discharge ends of said flow distribution means are separated with an angle from about 10° to about 20° between each other.

5. The burner as claimed in claim 1, wherein the main body includes a conical section, said conical section being uniformly reduced from a major diameter to a minor diameter in the body of said burner, said minor diameter being connected with the flow distribution means for increasing the velocity of the first flow of air or gas and said pulverized fuel-air mixture.

6. The burner as claimed in claim 1, wherein the main body includes an enlarged conical section, said enlarged conical section being uniformly reduced from a major diameter to a minor diameter in the body of said burner, said minor diameter being connected with the flow distribution means for increasing the velocity of the first flow of air or gas and said pulverized fuel-air mixture.

7. The burner as claimed in claim 1, wherein the at least one plurality of peripheral orifices are disposed in coincidence with the second connecting chamber to be formed in an angular position to provide a swirl effect to the first flow of air or gas and to said pulverized fuel-air mixture.

8. A burner for burning a pulverized fuel for use in a glass melting furnace, which comprises:
  a main body including:
    an outer pipe;
    an intermediate pipe; and
    an inner pipe;
    wherein the pipes are concentrically arranged one with the other;
    wherein the outer pipe and the intermediate pipe form a first pipe chamber;
    wherein the outer pipe includes:
      an inlet pipe; and
      an outlet pipe for introducing and for circulating a cooling fluid within the first pipe chamber for the cooling of the burner;
    wherein the intermediate pipe includes:
      a first inlet for introducing a first flow of air or gas in a second pipe chamber, the second pipe chamber being defined between the inner pipe and the intermediate pipe; and
    wherein the inner pipe includes a second inlet for introducing a flow of a pulverized fuel-air mixture through the inner pipe;
  flow distribution means having their entrance end connected in alignment with a lower end of the main body, the flow distribution means having a curvature to uniformly change the flow trajectory of the pulverized fuel-air mixture and the first flow of air or gas, the distribution means including:
    an outer cylindrical body;
    an intermediate cylindrical body;
    an inner cylindrical body; and
    a main chamber;
    wherein the outer cylindrical body and the intermediate cylindrical body define a first connecting chamber for circulating the cooling fluid of the main body for the cooling of the flow distribution means;
    wherein the inner cylindrical body and the intermediate cylindrical body define a second connecting chamber for receiving and for changing the flow trajectory of the first flow of air or gas of the second pipe chamber of the main body; and
    wherein the main chamber receives and conveys the mixture of pulverized fuel-air out to at least a discharge end of the flow distribution means to be mixed with the first flow of air or gas in a combustion zone of the glass melting furnace; and
  a discharge nozzle connected by each one of the discharge ends of the flow distribution means, the discharge nozzle including:
    a head; and
    a cylindrical member coupled in the rear part of the head, the cylindrical member having:
      a central orifice in a frusto-conical form, with a diameter less in a front portion thereof than in a rear portion thereof, with the central orifice in coincidence with the main fluid chamber for permitting the exit of the pulverized fuel-air mixture;
      a plurality of peripheral orifices disposed in coincidence with the second connecting chamber to permit the first flow of air or gas and the pulverized fuel-air mixture to be simultaneously mixed in each one of the discharge ends of the flow distribution means for producing a flame in the combustion zone of the glass melting furnace, wherein the plurality of peripheral orifices are formed in the periphery of the cylindrical member, with the plurality of peripheral orifices being formed transversally around the periphery of the cylindrical member to provide communication between the second connecting chamber and the central orifice of the discharge nozzle.

9. The burner as claimed in claim 8, wherein the plurality of peripheral orifices of the cylindrical member are formed in a perpendicular form with respect to the cylindrical member.

10. The burner as claimed in claim 8, wherein the plurality of peripheral orifices of the cylindrical member are formed tangentially with an angle from 0° to 15°, to produce a swirl effect of the first flow of air or gas around the pulverized fuel-air mixture.

11. A burner for burning a pulverized fuel for use in a glass melting furnace, which comprises:
  a main body including:
    an outer pipe;
    an intermediate pipe; and
    an inner pipe;
    wherein the pipes are concentrically arranged one with the other;
    wherein the outer pipe and the intermediate pipe form a first pipe chamber;
    wherein the outer pipe includes:
      an inlet pipe; and
      an outlet pipe for introducing and for circulating a cooling fluid within the first pipe chamber for the cooling of the burner;
    wherein the intermediate pipe includes:
      a first inlet for introducing a first flow of air or gas in a second pipe chamber, the second pipe chamber being defined between the inner pipe and the intermediate pipe; and
    wherein the inner pipe includes a second inlet for introducing a flow of a pulverized fuel-air mixture through the inner pipe;
  flow distribution means having their entrance end connected in alignment with a lower end of the main body, the flow distribution means having a curvature to uniformly change the flow trajectory of the pulverized fuel-air mixture and the first flow of air or gas, the distribution means including:
    an outer cylindrical body;
    an intermediate cylindrical body;
    an inner cylindrical body; and a main chamber;

wherein the outer cylindrical body and the intermediate cylindrical body define a first connecting chamber for circulating the cooling fluid of the main body for the cooling of the flow distribution means;

wherein the inner cylindrical body and the intermediate cylindrical body define a second connecting chamber for receiving and for changing the flow trajectory of the first flow of air or gas of the second pipe chamber of the main body; and wherein the main chamber receives and conveys the mixture of pulverized fuel-air out to at least a discharge end of the flow distribution means to be mixed with the first flow of air or gas in a combustion zone of the glass melting furnace; and a discharge nozzle connected by each one of the discharge ends of the flow distribution means, the discharge nozzle including:

a central orifice in coincidence with the main fluid chamber for permitting the exit of the pulverized fuel-air mixture; and a first plurality of orifices disposed in coincidence with the second connecting chamber to permit the first flow of air or gas and the pulverized fuel-air mixture to be simultaneously mixed in each one of the discharge ends of the flow distribution means for producing a flame in the combustion zone of the glass melting furnace;

wherein the discharge ends of the flow distribution means are separated with an angle ranging from about 10° to about 20° between each other.

12. A burner for burning a pulverized fuel for use in a glass melting furnace, which comprises:

a main body including:
an outer pipe;
an intermediate pipe; and
an inner pipe;
wherein the pipes are concentrically arranged one with the other;
wherein the outer pipe and the intermediate pipe form a first pipe chamber;
wherein the outer pipe includes:
an inlet pipe; and
an outlet pipe for introducing and for circulating a cooling fluid within the first pipe chamber for the cooling of the burner;
wherein the intermediate pipe includes:
a first inlet for introducing a first flow of air or gas in a second pipe chamber, the second pipe chamber being defined between the inner pipe and the intermediate pipe; and
wherein the inner pipe includes a second inlet for introducing a flow of a pulverized fuel-air mixture through the inner pipe;
flow distribution means having their entrance end connected in alignment with a lower end of the main body, the flow distribution means having a curvature to uniformly change the flow trajectory of the pulverized fuel-air mixture and the first flow of air or gas, the distribution means including:
an outer cylindrical body;
an intermediate cylindrical body;
an inner cylindrical body; and
a main chamber;
wherein the outer cylindrical body and the intermediate cylindrical body define a first connecting chamber for circulating the cooling fluid of the main body for the cooling of the flow distribution means;

wherein the inner cylindrical body and the intermediate cylindrical body define a second connecting chamber for receiving and for changing the flow trajectory of the first flow of air or gas of the second pipe chamber of the main body; and wherein the main chamber receives and conveys the mixture of pulverized fuel-air out to at least a discharge end of the flow distribution means to be mixed with the first flow of air or gas in a combustion zone of the glass melting furnace; and a discharge nozzle connected by each one of the discharge ends of the flow distribution means, the discharge nozzle including:

a central orifice in coincidence with the main fluid chamber for permitting the exit of the pulverized fuel-air mixture; and a first plurality of orifices disposed in coincidence with the second connecting chamber to permit the first flow of air or gas and the pulverized fuel-air mixture to be simultaneously mixed in each one of the discharge ends of the flow distribution means for producing a flame in the combustion zone of the glass melting furnace;

wherein the main body includes a conical section, the conical section being uniformly reduced from a major diameter to a minor diameter in the body of the burner, the minor diameter being connected with the flow distribution means for increasing the velocity of the first flow of air or gas and the pulverized fuel-air mixture.

13. A burner for burning a pulverized fuel for use in a glass melting furnace, which comprises:

a main body including:
an outer pipe;
an intermediate pipe; and
an inner pipe;
wherein the pipes are concentrically arranged one with the other;
wherein the outer pipe and the intermediate pipe form a first pipe chamber;
wherein the outer pipe includes:
an inlet pipe; and
an outlet pipe for introducing and for circulating a cooling fluid within the first pipe chamber for the cooling of the burner;
wherein the intermediate pipe includes:
a first inlet for introducing a first flow of air or gas in a second pipe chamber, the second pipe chamber being defined between the inner pipe and the intermediate pipe; and
wherein the inner pipe includes a second inlet for introducing a flow of a pulverized fuel-air mixture through the inner pipe;
flow distribution means having their entrance end connected in alignment with a lower end of the main body, the flow distribution means having a curvature to uniformly change the flow trajectory of the pulverized fuel-air mixture and the first flow of air or gas, the distribution means including:
an outer cylindrical body;
an intermediate cylindrical body;
an inner cylindrical body; and
a main chamber;
wherein the outer cylindrical body and the intermediate cylindrical body define a first connecting chamber for circulating the cooling fluid of the main body for the cooling of the flow distribution means;

wherein the inner cylindrical body and the intermediate cylindrical body define a second connecting chamber for receiving and for changing the flow trajectory of the first flow of air or gas of the second pipe chamber of the main body; and wherein the main chamber receives and conveys the mixture of pulverized fuel-air out to at least a discharge end of the flow distribution means to be mixed with the first flow of air or gas in a combustion zone of the glass melting furnace; and a discharge nozzle connected by each one of the discharge ends of the flow distribution means, the discharge nozzle including:

a central orifice in coincidence with the main fluid chamber for permitting the exit of the pulverized fuel-air mixture; and a first plurality of orifices disposed in coincidence with the second connecting chamber to permit the first flow of air or gas and the pulverized fuel-air mixture to be simultaneously mixed in each one of the discharge ends of the flow distribution means for producing a flame in the combustion zone of the glass melting furnace;

wherein the main body includes an enlarged conical section, the enlarged conical section being uniformly reduced from a major diameter to a minor diameter in the body of the burner, the minor diameter being connected with the flow distribution means for increasing the velocity of the first flow of air or gas and the pulverized fuel-air mixture.

14. A burner for burning a pulverized fuel for use in a glass melting furnace, which comprises:

a main body including:
  an outer pipe;
  an intermediate pipe; and
  an inner pipe;
  wherein the pipes are concentrically arranged one with the other;
  wherein the outer pipe and the intermediate pipe form a first pipe chamber;
  wherein the outer pipe includes:
    an inlet pipe; and
    an outlet pipe for introducing and for circulating a cooling fluid within the first pipe chamber for the cooling of the burner;
  wherein the intermediate pipe includes:
    a first inlet for introducing a first flow of air or gas in a second pipe chamber, the second pipe chamber being defined between the inner pipe and the intermediate pipe; and wherein the inner pipe includes a second inlet for introducing a flow of a pulverized fuel-air mixture through the inner pipe;

flow distribution means having their entrance end connected in alignment with a lower end of the main body, the flow distribution means having a curvature to uniformly change the flow trajectory of the pulverized fuel-air mixture and the first flow of air or gas, the distribution means including:

an outer cylindrical body;

an intermediate cylindrical body;

an inner cylindrical body; and a main chamber;

wherein the outer cylindrical body and the intermediate cylindrical body define a first connecting chamber for circulating the cooling fluid of the main body for the cooling of the flow distribution means;

wherein the inner cylindrical body and the intermediate cylindrical body define a second connecting chamber for receiving and for changing the flow trajectory of the first flow of air or gas of the second pipe chamber of the main body; and wherein the main chamber receives and conveys the mixture of pulverized fuel-air out to at least a discharge end of the flow distribution means to be mixed with the first flow of air or gas in a combustion zone of the glass melting furnace; and a discharge nozzle connected by each one of the discharge ends of the flow distribution means, the discharge nozzle including:

a central orifice in coincidence with the main fluid chamber for permitting the exit of the pulverized fuel-air mixture; and a first plurality of orifices disposed in coincidence with the second connecting chamber to permit the first flow of air or gas and the pulverized fuel-air mixture to be simultaneously mixed in each one of the discharge ends of the flow distribution means for producing a flame in the combustion zone of the glass melting furnace, wherein the first plurality of orifices disposed in coincidence with the second connecting chamber are formed in an angular position to provide a swirl effect to the first flow of air or gas and to the pulverized fuel-air mixture.

* * * * *